INVENTORS
John G. Osburn, Richard E. Stobbe,
Frank Zank
BY
Attorney

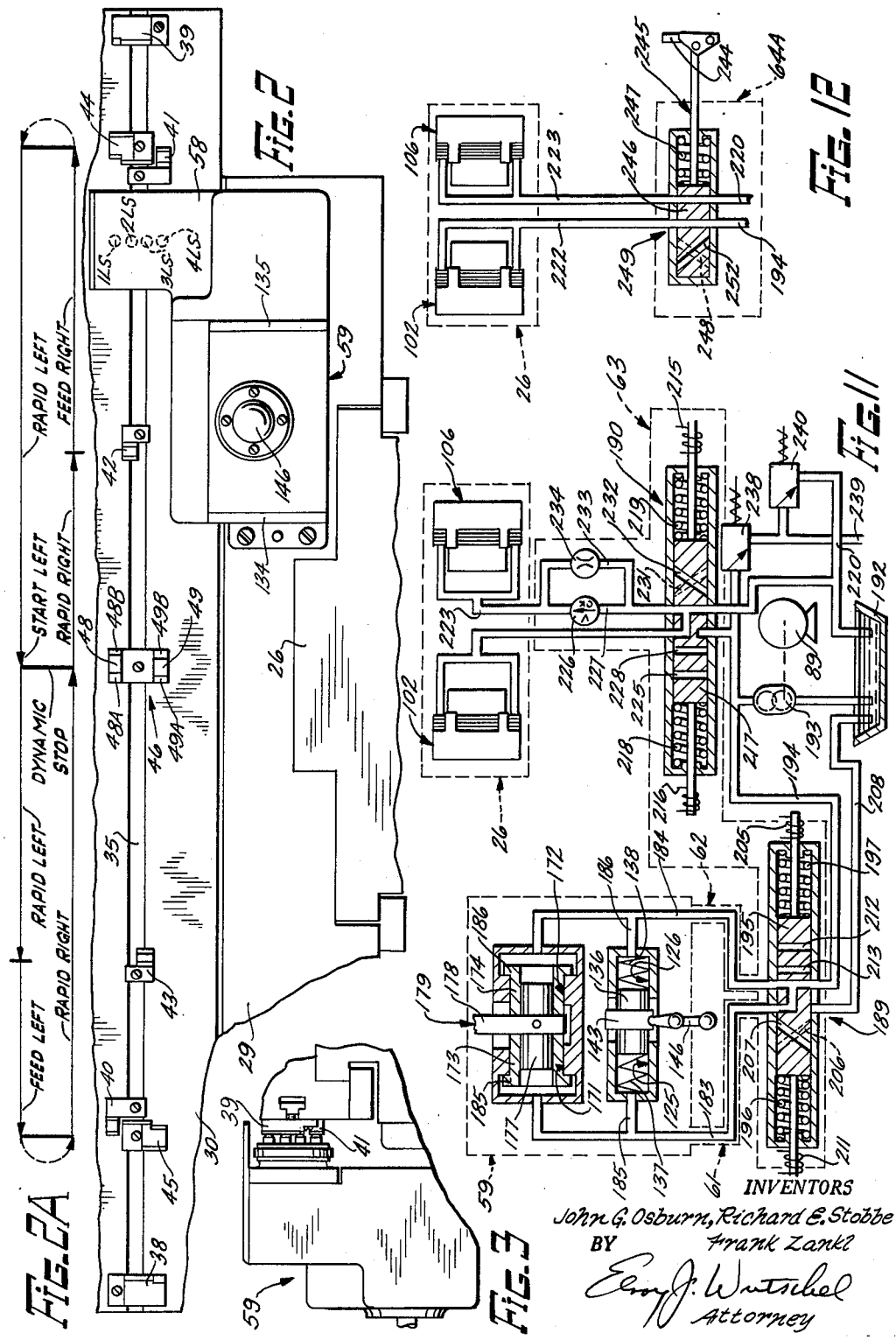

Nov. 30, 1965 J. G. OSBURN ETAL 3,220,274
AUTOMATIC CYCLE CONTROL SYSTEM
Original Filed April 1, 1960 6 Sheets-Sheet 3
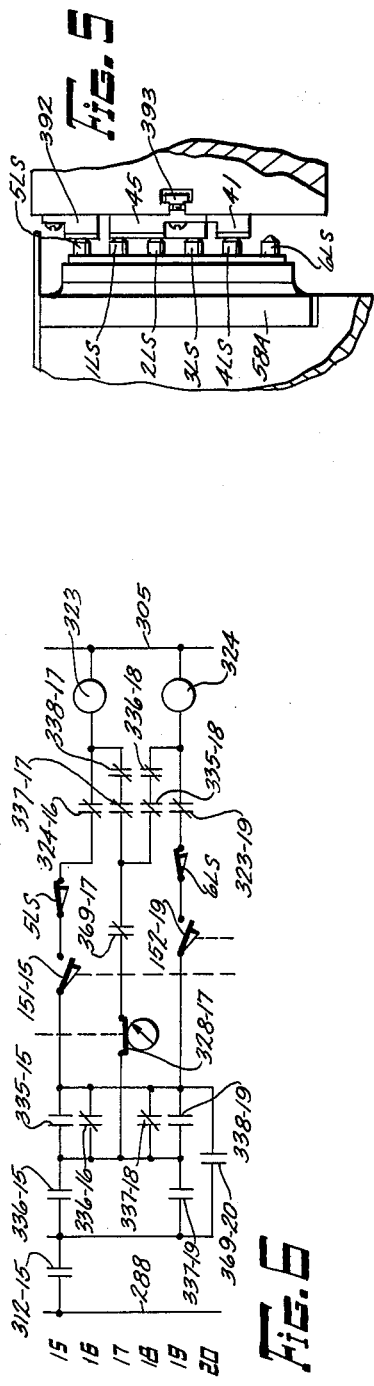
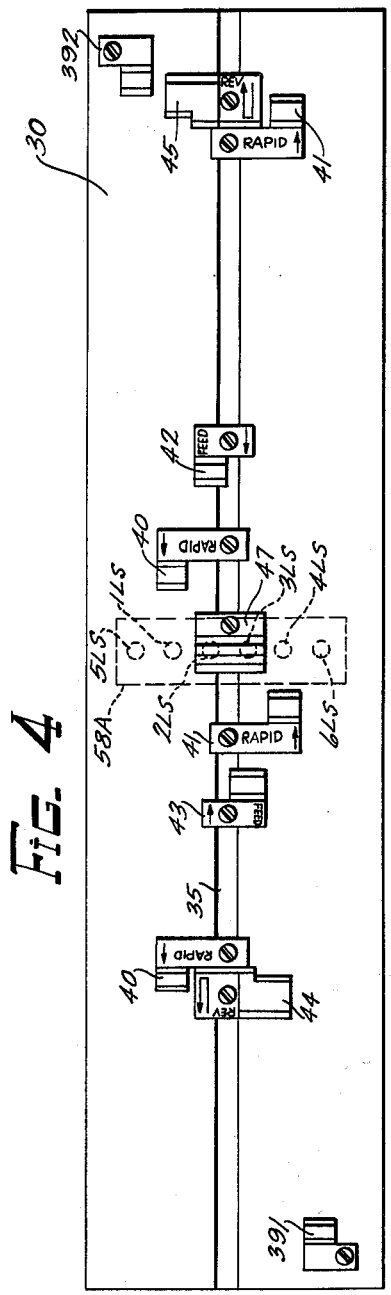
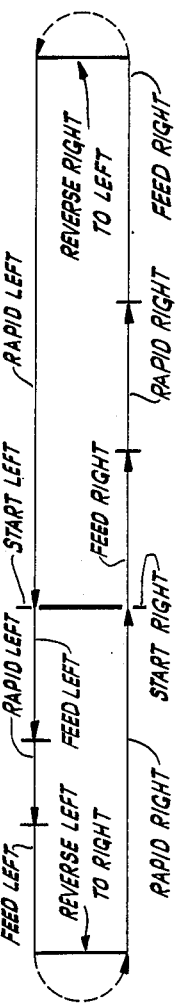
INVENTORS
John G. Osburn, Richard E. Stobbe
Frank Zankl
BY
Attorney

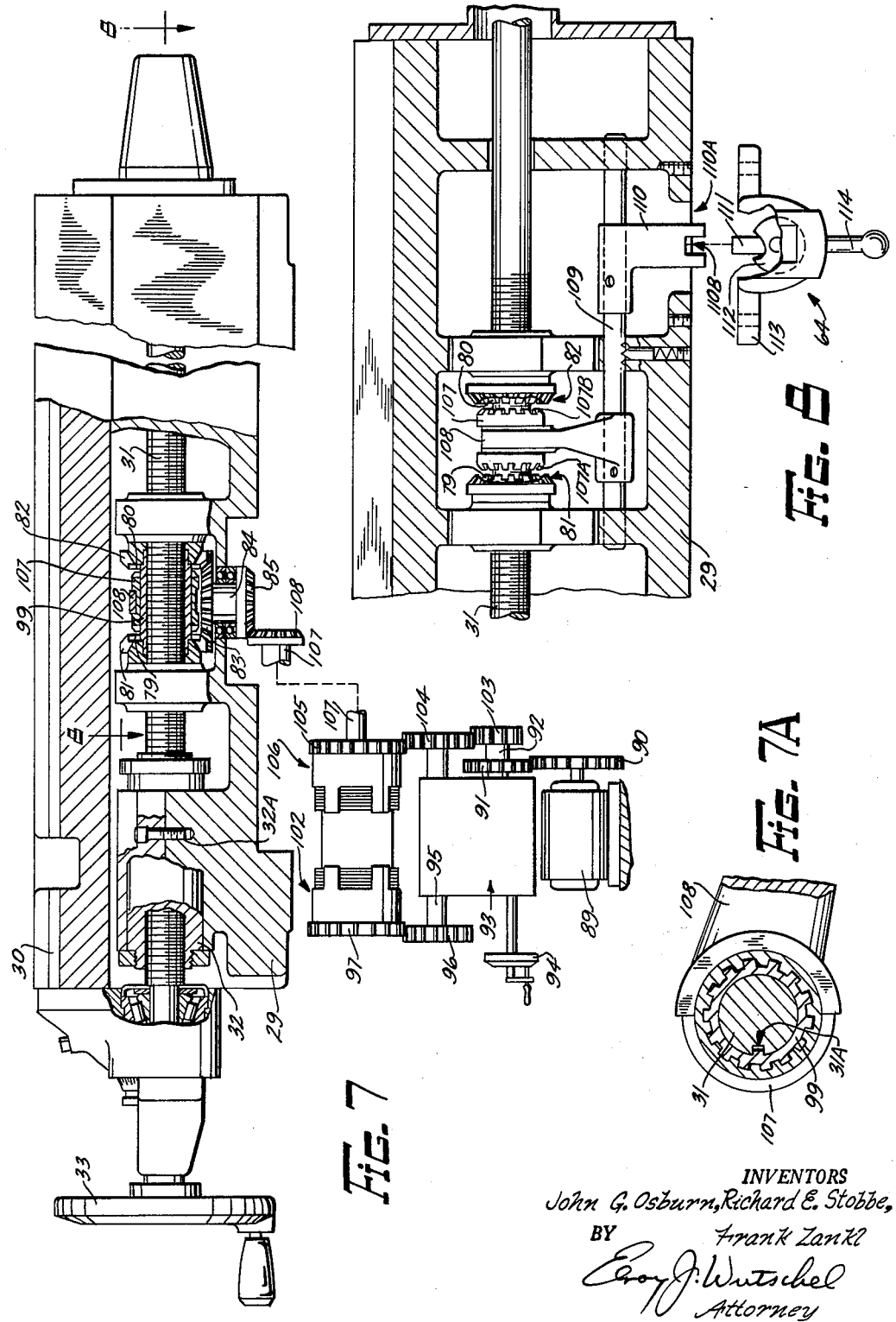

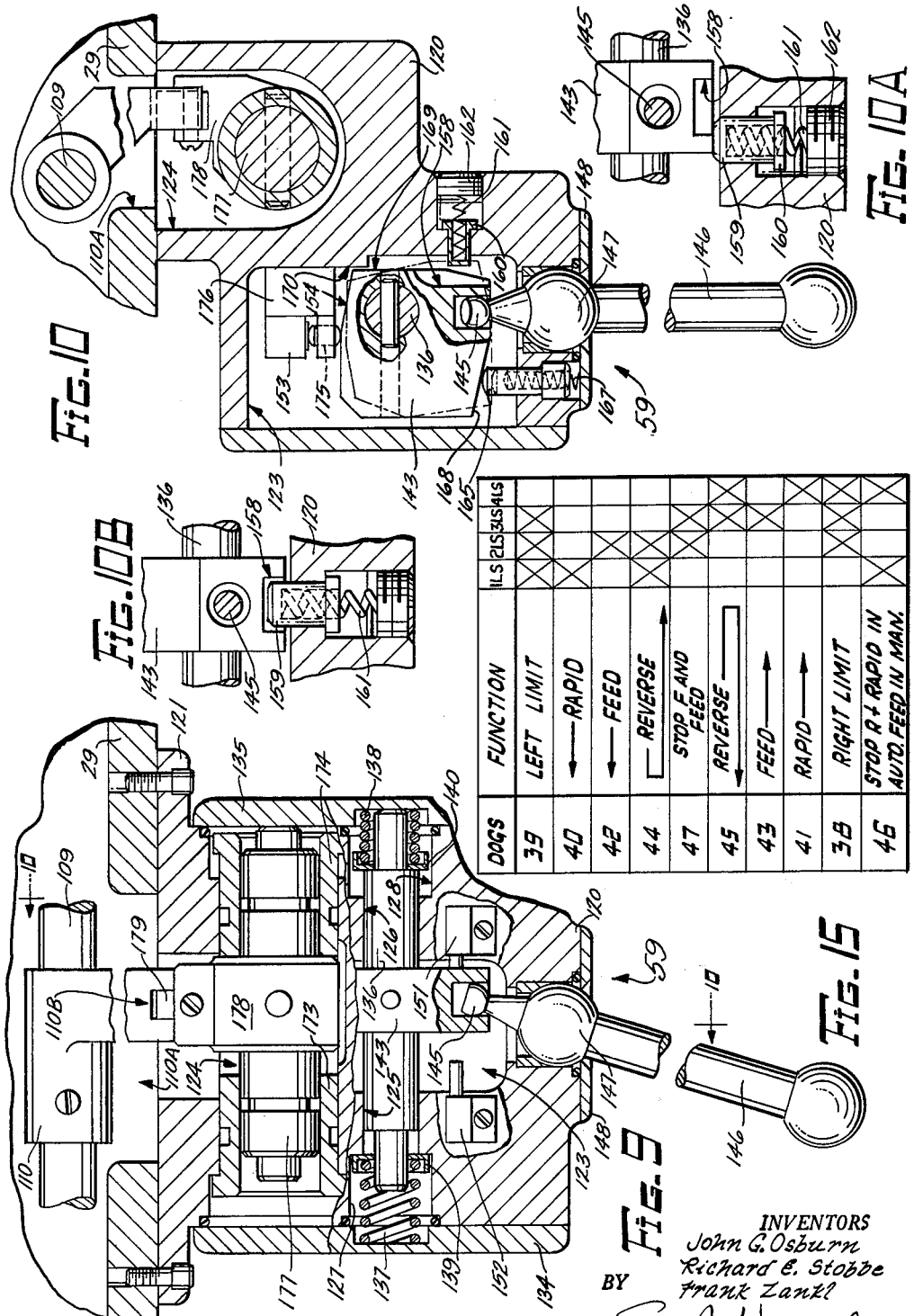

3,220,274
AUTOMATIC CYCLE CONTROL SYSTEM
John G. Osburn, Richard E. Stobbe, and Frank Zankl, Milwaukee, Wis., assignors to Kearney & Trecker Corporation, West Allis, Wis., a corporation of Wisconsin
Continuation of application Ser. No. 19,362, Apr. 1, 1960. This application Oct. 18, 1963, Ser. No. 317,875
13 Claims. (Cl. 74—365)

This is a continuation of our copending patent application, Serial No. 19,362, filed April 1, 1960 for an Automatic Cycle Control System, now abandoned.

This invention relates to automatic control systems for machine tools, and more particularly to a coded control system for effecting continuous or intermittent automatic cycles of a reciprocable work support, in combination with a hydraulic control system including a parallel connected power piston and pilot piston respectively operative to effect reversal of a directional clutch and a directional control lever during automatic cycle operation.

A principal object of the invention is to provide a greatly improved automatic cycle control system for a machine tool that is operative to effect continuous or intermittent automatic control of reciprocable movements of a power driven machine tool support member.

Another object of the invention is to provide an improved directionally sensitive control lever that is manually movable in a direction corresponding to selected movement to initiate slide movement, and automatically operative during continuous cycle control of the machine to a position corresponding to the direction of slide movement.

Another object of the invention is to provide an improved unitary electro-hydraulic control assembly that can be secured to a machine tool.

Another object of the invention is to provide an improved unitary electro-hydraulic control system having signal receiving trip switches, a hydraulic power piston for effecting directional control of a reversing clutch for effecting reciprocable movement of a work support relative to the trip switches and a parallel connected pilot piston operative to effect reversing control of a directional lever, that is operative to engage the reverse clutch for initiating table movement.

Another object of the invention is to provide in combination with the reciprocable worktable of a machine tool, a directional control lever manually operative to initiate table movement, and a code actuated cycle control system operable to effect continuous automatic cycle control of the worktable including changes in the rate of worktable movement, as well as changes in the direction of worktable and control lever.

A further object of the invention is to provide an improved electro-hydraulic cycle control system for a reciprocable machine tool worktable with provision for bringing the worktable to a dynamic stop position at any predetermined point, and provision for reinitiating worktable movement in either direction from a dynamic stop position.

A further object of the invention is to provide a novel electro-hydraulic interconnection between a pivotable directional control lever and a direction controlling clutch for effecting selective reversible movement of a reciprocable worktable.

A still further object of the invention is to provide an improved manually operative electro-hydraulic, pivotably mounted directional control lever that is manually pivotable to electrically initiate operation of an associated electrical control circuit for moving the table in a selected direction, and hydraulically actuable in response to subsequent operation of the associated electrical control circuit to reverse the direction of table movement and reverse the pivotable position of the directional lever.

A still further object of the invention is to provide improved means for coordinating the operation of a directional clutch control mechanism, a manually operative directional control lever, and an electro-hydraulic control system including code operated input switches positioned to be selectively actuated by preset dogs mounted on a power driven reciprocable work support connected to be controlled by the associated clutch mechanism and control lever.

A still further object of the invention is to provide an improved code actuated automatic cycle control system operative to stop movement of a worktable at any predetermined position, and being selectively preset to immediately reinitiate worktable movement in either direction at either a feed or rapid traverse rate.

According to this invention, a machine tool having a power driven reciprocable work support, is provided with an improved unitary, electro-hydraulic automatic cycle control system for effecting either continuous or intermittent predetermined cycles of table movement. The unitary control system is provided with code operated switches positioned to be activated by one or another of the plurality of dogs adjustably secured to the worktable for actuation thereby in either direction of worktable movement. A pair of reversing clutches operative to effect table movement in either direction, and positionable to a neutral position, are connected to be driven by hydraulic actuating means. A pivotable directional lever is selectively movable in either direction from the neutral position to initiate table movement in either direction under manual control, or to initiate table movement in either direction for effecting a preset automatic cycle of worktable movements under the cooperative control of the table dogs and the coded trip switches carried by the unitary control system. Whenever reversal in the direction of movement is effected during automatic cycle operation, coded switch actuation operates to activate the hydraulic means for connecting the opposite directional clutch to control table movement. Simultaneously therewith, a pilot piston interconnected in parallel with the clutch operating hydraulic means, is connected to effect a reversal in the position of the manually operable directional lever, which is thus always positioned to indicate the direction of table movement.

For controlling the rate of table movement, a pair of power driven rate change clutches are respectively connected to supply power for rotating the directional clutches. Thus, as the table is moving during automatic cycle, coded actuation of the appropriate trip switches in response to the preset trip dogs operates to immediately disengages one of the rate change clutches and engage the other of the rate change clutches, in a manner that the rate of table movement can be selectively changed from feed to rapid traverse and vice versa. In the event reverse dogs are preset at opposite ends of the table, automatic reversal in a direction of table movement, with the accompanying required rate changes taking place between reversals, will continue indefinitely until the directional lever is manually returned to its neutral position. At any point during automatic cycle movements of the worktable, the directional lever may be manually returned to its neutral position to override the cooperating dog and coded trip switch control system. Likewise, after momentary manual interruption of the preset automatic cycle, the directional lever may be again manually moved to reinitiate, or continue the preselected cycle of table movements. Likewise, the manual control lever may be utilized to effect a change in rate from feed to rapid, without interrupting automatic cycle movements which continue under the control of the preset trip dogs and coded trip switches.

The control system is also arranged to provide a dynamic stop condition by means of a dynamic stop dog secured to the table for effecting predetermined coded actuation of the trip switches. During such a condition of operation, table movement in either direction immediately stops upon engagement of the coded trip switches with the dynamic stop dog thereby effecting activation of the hydraulic means to return both directional clutches to neutral disengaged position and effect movement of the directional control lever to its neutral position. As this occurs, a circuit condition is immediately established for reinitiating worktable movement in either direction by effecting corresponding manual movement of the table directional lever. Thus, from the dynamic stop position, table movement can be resumed in the original direction of travel with the code actuated trip switches being then moved out of engagement with the coacting dynamic stop dog. By means of the dynamic stop dog, two automatic cycles of table movement can be established from a dynamic stop center position of the table. During this condition of operation, the table is first caused to move in one direction, with reversal automatically taking place and returned to the stop position. Next, the table is automatically cycled in the opposite direction, reversed and returned to the dynamic stop position. The required rate changes, from feed to rapid traverse and vice versa may be preset for each separate cycle of movements from the stop position. Thus, while one end of the worktable is automatically cycled with respect to the associated cutting spindle, a different workpiece may then be loaded on the opposite end of the worktable, which is then not in proximity to the tool spindle.

The foregoing and other objects of the invention which will become more fully apparent from the following description of mechanisms and integrated electro-hydraulic system embodying a further embodiment thereof, may be achieved by the embodying apparatus described herein in connection with the accompanying drawings, in which:

FIG. 2 is a partial elevation of the table and apron, and of a unitary control mechanism including four electrical switches carried thereby in fixed position adjacent the longitudinally reciprocable table for actuation by dogs adjustably secured to the table to produce a particular preselected continuous or intermittent cycle of automatic table movements;

FIG. 2A is a diagram indicating the automatic cycle of table movements with trip dogs positioned as shown in FIG. 2;

FIG. 3 is a fragmentary view in end elevation of the control mechanism and cooperating trip dogs;

FIG. 4 is a view similar to FIG. 2 but showing a modified post with six switches to be operated by the dogs on the table;

FIG. 4A is a diagram indicating the cycle of table movements effected with dogs positioned as shown in FIG. 4;

FIG. 5 is an end elevation of the table, and the modified trip post of FIG. 4, and provided with six trip switches;

FIG. 6 is a fragmentary schematic view of the electrical control circuit including the two switches on the trip post in addition to the four switches shown in FIG. 4;

FIG. 7 is a view partially in elevation and partially in longitudinal section to show a portion of the reversible drive for operating the table screw to move the worktable and diagrammatically showing other portions of the drive;

FIG. 7A is an enlarged detailed view in transverse vertical section through the table screw and drive clutch;

FIG. 8 is a fragmentary view in longitudinal horizontal section of manually actuated means of the reverse clutch and including a manual control assembly;

FIG. 9 is a view partially in horizontal top plan and partially in section, of solenoid actuated fluid pressure actuated means for engaging the reverse clutches and automatically actuating the directional lever;

FIG. 10 is a view in transverse vertical section through the unitary electro-hydraulic control assembly and taken along the line 10—10 in FIG. 9;

FIG. 10A is an enlarged fragmentary view in vertical section through the latch for the control lever cam block;

FIG. 10B is a view partly in transverse section and partly in elevation of the cam block latch;

FIG. 11 is a schematic diagram of the hydraulic circuit for power operation of the directional and rate change clutches of the table drive;

FIG. 12 is a schematic diagram showing the hydraulic control for the rate change clutches used in combination with the manually operative directional control lever;

Figure 1:
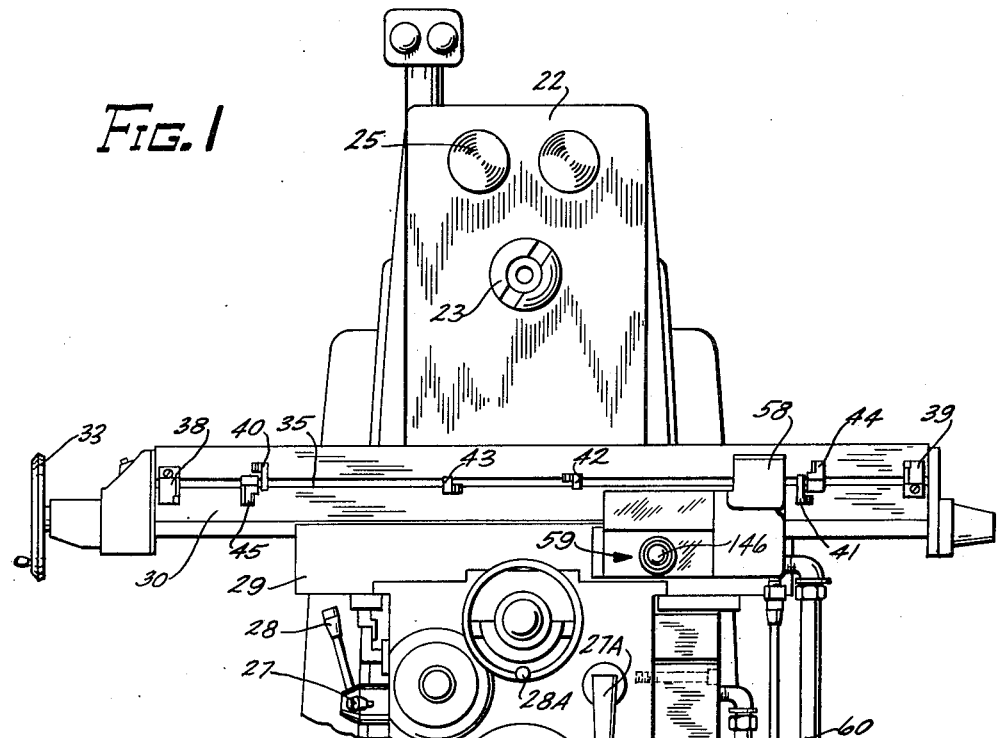
FIGURE 1 is a general view in front elevation of a milling machine embodying the present invention.

Referring specifically to the drawings, the machine includes a hollow base 20, and a vertically upstanding hollow column 21 that carries in its upper portion 22 a horizontally disposed, rotatable tool spindle 23; and in which are fixed overarms 25 overlying the spindle and a cutter (not shown). The spindle drive is mounted within the column, as represented in fragmentary schematic form in FIG. 13.

A hollow knee structure 26 is slidably carried by the front face of the supporting column 21 for selective vertical adjustment in well known manner. The usual screw and nut elevating mechanism (not shown) is connected to be selectively actuated by a clutch engageable power directional lever 27 which is journalled toward the left side of the knee structure 26. Upward movement of the directional lever 27 connects a power driven transmission (not shown) in well-known manner to effect corresponding upward vertical movement of the knee 26, and conversely, downward movement of the lever 27 effects corresponding downward vertical movement of the knee 26. A hand crank 27A is connectable to effect manual vertical adjustment of the knee 26.

The vertically adjustable knee 26 carries on its upper way surfaces a saddle 29 that, in turn, is slidably supported for horizontal transverse movement toward and away from the front face of the column 21. A directional power control lever 28 and manually rotatable hand wheel crank 28A are connectable in well-known manner to actuate a power driven screw and nut translating mechanism (not shown) for effecting transverse movement of the saddle 29.

The saddle 29 is, in turn, provided on its upper surface with way surfaces adapted to slidably support a worktable 30 for selective longitudinal movement relative to the column 20 and tool spindle 23.

The table 30 is reciprocated by rotation of a screw 31 acting through a nut 32 (see FIG. 7), the screw being driven by power means to be described or being rotatable by a handwheel 33. The handwheel 33 is selectively connectable by means of a manually disengaged clutch mechanism (not shown) for rotating the screw 31. The table 30, is provided in its front face with a longitudinal T slot 35 for adjustably receiving a plurality of dogs (FIGS. 1, 2 and 4) which, upon movement of the table, engage in selective or coded fashion with a plurality of switches to actuate the electrical control system as will hereinafter be described.

Referring to FIGS. 1, 2 and 4, some of the dogs shown in such figures perform identical functions or conditions of operation and are given the same reference numerals. Referring to FIGS. 1 and 2, dogs 38 and 39 are end limit stops and are fixedly and nonadjustably secured to the front face of the table to limit table movement in each direction, while all other dogs are adjustable in the T slot 35. Dogs 40 and 41 operate during table movement to initiate rapid traverse of the table respectively toward the left and toward the right, and dogs 42 and 43 control movement of the table at feed rate respectively toward the left and toward the right. Dogs 44 and 45 respectively cause reversal of table movement from right to left, and from left to right and the effective surfaces thereof are slightly offset to provide delay in actuating their respective switches. Stop "R" dog 46, (FIG. 2), and stop "F" dog 47 (FIG. 4), are designed to stop table movement and then permit manually initiated resumption of table movement in either direction, dog 46 causing rapid traverse and dog 47 causing feed rate movement only upon resuming table travel. The effective surfaces of dog 46 are slightly offset relative to each other so that, when the table is being moved toward the right, one switch is engaged slightly in advance of the other switch actuated by such dog. Similarly, when the table is being moved toward the left, one switch is actuated slightly in advance of another switch. Some of the dogs are identical in configuration to others for performing like functions so that the dogs can be reversibly placed in the T slot 35 to perform like functions for different directions of movement.

The dogs 38–47 severally coact with and actuate one or another, or combinations of plungers, of switches mounted on a trip control post 58 as shown in FIG. 2, so that the switches may be opened and re-closed during table movement in coded fashion dependent upon the position of the dogs along the table. The coaction of the dogs and four switches shown in FIG. 2 and the dogs and six switches shown in FIG. 5 in effect cooperate with the associated electrical control circuit to provide a "memory" for the control system as shown by the chart in FIG. 15.

As shown in the chart illustrating the code setting, FIG. 15, the four trip switches utilized in the principal embodiment of this invention coact with the respective trip dogs to produce nine different machine functions or conditions of operation. It will be readily apparent that the switches are operated in response to a particular dog only during table movement. In some cases, however, table movement will stop, permitting continued engagement between certain of the trip switches and the associated trip dog, these conditions occurring either upon movement of the table to one of its extreme limits or upon presetting the control system for a dynamic stop position. In all cases except as to the limit and stop dogs 39, 38, 45, an arrow designation, shown with the function in FIG. 15 and upon the trip dogs in the drawings, is utilized to indicate the direction of table movement operative to initiate a particular preselected function. A comparison of the drawings and FIG. 15, for example, illustrates more clearly the fact that the dogs are reversibly secured to the T slot contained in the front face of the table. Thus, although different reference numerals are used to indicate feed dogs 42, 43, the configuration of these dogs is identical and the functions respectively initiated by each of them depends upon their position with respect to the table T slot 35. The dogs 40 and 41 are likewise of identical configuration and, depending upon their position with respect to T slot 35, operate respectively to initiate left rapid traverse movement or right rapid traverse movement. In like manner, reverse dogs 44 and 45 respectively effect table reversal to the left or to the right, depending upon their position relative to the front face of the table and the respective trip switches carried by the control post 58.

As shown in FIGS. 2 and 3, the inwardly projecting switch plungers of limit switches 1LS to 4LS inclusive are carried by the trip post 58 which is in turn carried by a unitary electro-hydraulic control unit assembly 59. As indicated in the coded chart, FIG. 15, the respective trip switches 1LS to 4LS inclusive are operative in coded fashion by one or the other of the associated trip dogs secured to the table during reciprocable movement thereof. It will be apparent that during rightward table movement at rapid rate, engagement of dog 43 with limit switch 3LS will automatically effect a change from rapid to feed rate, with movement being continued in a rightward direction until the appropriate trip switches are engaged by the left reverse dog 45. In similar manner, during leftward movement of the table at rapid rate, momentary engagement of dog 42 with the plunger of switch 2LS effects a change from left rapid to left feed, with table movement continuing at feed rate in a leftward direction.

One of the principal advantages of this invention is the fact that the worktable may be moved to a dynamic stop position, with table movement being resumed by manual control to continue the preset cycle of table movements. This dynamic stop condition will occur, for example, whenever the stop "R" dog 46 engages switches 1LS and 4LS respectively. As shown in FIG. 2, the stop "R" dog 46 is provided with an upper land 48 positioned centrally with respect to angular cam faces 48a and 48b respectively. Likewise, dog 46 is provided with the lower switch engaging land 49 positioned centrally with respect to angular cam faces 49a and 49b respectively. Thus, assuming the table is being moved rightwardly, the land 48 of dog 46 fully engages switch 1LS slightly in advance of land 49 effecting actuation of switch 4LS. In a similar manner, during leftward movement of the worktable to a dynamic stop position, dog 46 effects the opposite sequential switch actuation inasmuch as land 49 fully activates switch 4LS slightly in advance of land 48 activating switch 1LS. The general arrangement of the various trip dogs to effect switch actuation is similar, in that each of them is provided with an outwardly projecting land positioned between two beveled angular cam faces. Thus, irrespective of the direction of table movement, one of the beveled cam faces effects the necessary gradual actuation of the appropriate trip switch plunger, with the associated land effecting full activation of the switch to initiate the corresponding machine function.

The unitary electro-hydraulic control unit 59 carrying the switch trip post 58 is connected by means of flexible lines 60, 61 and 62, FIG. 1, respectively to receive electrical current and hydraulic pressure fluid from a housing 63 secured to the relatively movable knee 26.

In machines provided with the improved automatic cycle control system disclosed in this invention, the unitary electro-hydraulic control unit 59, FIGS. 1 and 9, together with the solenoid valve housing 63, FIGS. 1 and 11, are respectively bolted to the front face of the saddle 29 and the side face of the hollow knee structure 26. During the manufacturing process, the machine tool illustrated in FIG. 1 may be constructed to incorporate the automatic control system, including control unit 49 and housing 63, with no changes or modifications of the internal cooperating structure contained within the saddle 29 and the knee 26. Alternatively, the machine illustrated in FIG. 1, may be constructed to include only a manual table directional control with a separate single rapid traverse control system operating in conjunction therewith with no modifications to the internal operating structure in either the saddle 29 or knee 26. In such a case, a greatly simplified manually operable table directional control assembly 64 is bolted directly to the front fact of the saddle 29, as shown in FIG. 8, in lieu of the unitary electro-hydrualic control unit 59, shown in FIGS. 1 and 9. Likewise, to cooperate with the manual directional control assembly 64, a greatly simplified manually operative rapid traverse control valve contained with a separate housing, as schematically illustrated within the dotted lines 64a in FIG. 12, is bolted directly to the right side face of the knee 26 in lieu of the solenoid control housing 63 shown in FIG. 1.

Thus, the machine tool illustrated in FIG. 1 may be supplied during the original manufacturing operation as either a completely automatic cycle control machine or as a conventional, manually controlled machine. In either case, the components required for automatic control are contained in two separate unitary assemblies (control unit 59 and housing 63) and the control elements required for manual control only are contained within two separate assemblies (64 in FIG. 8 and 64A in FIG. 12). Irrespective of whether the machine is to be provided with completely automatic or manual control, no extensive changes or modifications are required on either the major housings for the saddle 29 or the knee 26, and likewise the internal operating structure respectively carried within these units is identical, expecting that it is interconnected in slightly different manner with the respective control assemblies.

The tool spindle 23 is driven by a motor 65 (see FIGS. 13 and 14) through gearing, of which a portion can be shifted to yield high and low spindle speeds by means of a variable speed transmission which is generally indicated at 66. Gear 67 on the shaft of motor 65 meshes with gear 68 adapted to be connected to the input shaft of the speed changer 66 by a hydraulically actuatable clutch 69. The output shaft of speed changer 66 drives a gear 70 meshing with gear 71 on spindle 23. A hydraulically actuatable brake 72 is provided with a housing 72A fixedly secured to an interior wall of the column 21. The housing 72A engages a plurality of clutch plates that may be frictionally engaged with cooperating plates carried by the spindle 23. Flow of liquid pressure to and from clutches 69 and brake 72 is controlled by a solenoid controlled valve 73 of the cylindrical plug type and having passages therethrough for connection of a pressure supply line 74, or an exhaust line 75, for selective connection to actuate either the spindle clutch 69 or the spindle brake 72.

Figure 13:
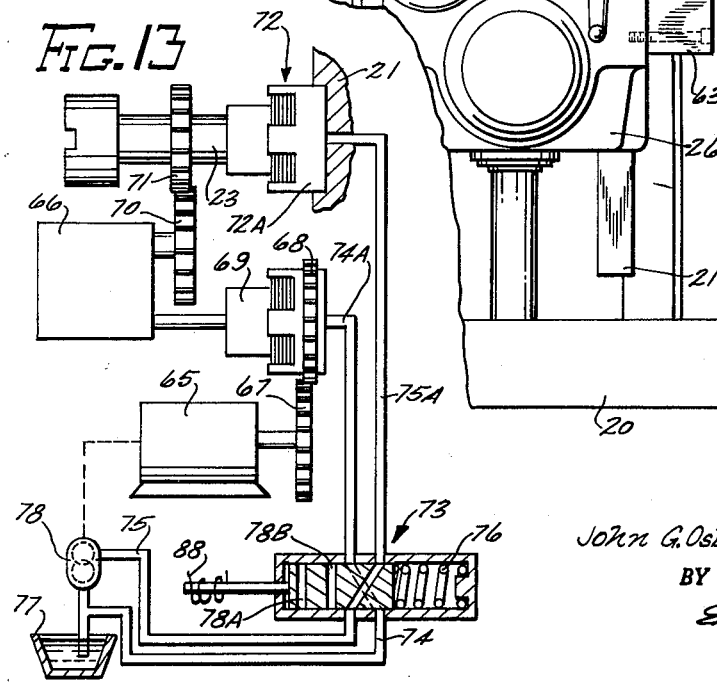
FIG. 13 is a schematic diagram showing a hydraulic control circuit for controlling engagement of the spindle drive clutch and brake.

With the valve spool of valve 73 biased leftwardly by spring 76, as shown in FIG. 13, pressure fluid is transmitted from line 75 via a line in the valve spool to a line 75A connected to effect engagement of the multiple disc brake 72, thus braking the tool spindle 23 against rotation. At the same time, the clutch 69 is deactuated, since the supply line 76A is connected via a line in the valve spool to the exhaust line 74, thus returning hydraulic fluid to a sump 77 contained within the hollow central portion of the column 21. To supply pressure fluid for the spindle drive control system, hydraulic fluid from the column sump 77 is withdrawn by the inlet line connected to a pump 78 driven by the spindle drive motor 65. The pump supplies pressure fluid to supply line 75. Whenever a solenoid 88 is energized, the valve spool is moved rightwardly in opposition to spring 76, thus interconnecting the pressure supply line via a line 78A directly to the spindle drive clutch supply line 74A. At the same time, fluid is exhausted from the brake 72 via line 75A connected through a valve spool line 78B to the exhaust line 74. In other words, whenever the brake 72 is engaged to brake the tool spindle against rotation, the drive clutch 69 is disengaged. Conversely, energization of solenoid 88 effects disengagement of the spindle brake 72, and engagement of the spindle drive clutch 69 for rotating the tool spindle 23 at a speed determined by the setting of the variable speed transmission mechanisms 66.

Referring now to the drive for worktable 30, as shown in FIGS. 7 and 8, the table screw 31 is journalled at its opposite ends in depending end brackets secured to the table, only the left bearing being shown in FIG. 7. The rotatable table screw 31 is engaged by a fixed nut 32 secured within the saddle 29 by cap screws 32A extending through flanges extending from the nut. Oppositely rotating clutch members 79 and 80 journalled to rotate in bored openings formed in upstanding saddle webs are separately connectable to rotate the screw 31 for moving the table 30 in a rightward or leftward direction respectively. Each clutch member 79 and 80 is provided with gear teeth 81 and 82 which continuously mesh with a drive gear 83 journalled to rotate in the saddle. Gear 83 is driven by a shaft 84 carrying a gear 85 driven from the output of gearing for driving the table.

The drive for moving the table 30 at feed or rapid traverse comprises motor 89 having a gear 90 on the shaft thereof to mesh with gear 91 on the input shaft 92 of a speed change transmission generally indicated at 93, and which can be adjusted in well-known manner by movement of a speed selector 94. The output shaft 95 from the speed changer 93 has a gear 96 thereon meshing with gear 97 secured to the drive housing for a feed drive clutch 102.

As shown in FIG. 7, power for driving the worktable 30 at rapid traverse rate is derived from the common driven shaft 92 via a gear 103 secured thereto, which is in turn connected by a rotatably journalled idler gear 104 to drive a gear 105 secured to the driving housing of a rapid traverse drive clutch 106. The rapid traverse drive clutch 106 is provided, in well known manner, with drive plates connected to be rotated by rapid traverse gear 105, and cooperatively associated driven plates keyed directly to the output shaft 107. In a similar manner, the feed drive clutch 102 is provided with driving plates connected to be driven by the feed drive gear 97, and cooperatively associated driven plates carried for independent rotation by the output shaft 107. As will hereinafter be more fully explained, the arrangement is such that at the same time the feed drive clutch 102 is engaged to transmit power from gear 97 to rotate shaft 107, the rapid traverse clutch 106 is disengaged. Conversely, engagement of the rapid traverse clutch 106 to transmit power from the gear 105 to rotate shaft 107 occurs only when the feed drive clutch 102 is disengaged. By means of this arrangement, it will be apparent that the output shaft 107 can be selectively driven at either a predetermined feed rate or at a rapid traverse rate to effect a corresponding rate of rotation of gear 108, gear 85, and reverse gears 81 and 82.

To transmit power from one or another of the clutch elements 79, 80, respectively driven by reverse gears 81, 82; a clutch spool 107 is slidably splined to the periphery of the drive sleeve 99 for axial shifting movement in either direction from its central neutral position represented in FIG. 7. At its opposite ends, the clutch spool 107 is provided with clutch teeth 107A and 107B, the latter being rightwardly movable therewith into driving engagement with cooperating clutch teeth presented by clutch element 80 for rotating the feed screw 31 to effect leftward movement of the worktable 30. Whenever clutch spool 107 is shifted leftwardly from its neutral position, it engages clutch teeth presented by clutch element 79 to effect opposite rotation of feed screw 31 for moving the worktable 30 in a rightward direction.

For effecting selective shiftable movement of the clutch spool 107, an annular groove presented thereby is engaged by a shifting fork 108 pinned at its opposite end to an axially movable shiffter rod 109 carried by spaced apart bored openings formed in transverse webs within the saddle 29. To move the shifting fork 108, an actuating fork 110 is pinned to the axially movable rod 109 and is provided with a transverse arm projecting outwardly through an opening 110A formed in the front wall of the hollow saddle 29. At its outer end, the arm of the actuating member 110 is provided with a vertical slot 110B capable of being engaged by a movable actuator, such as the tongue 111 constituting part of the manual control assembly 64 in FIG. 8.

As hereinbefore explained, the actuating mechanism for effecting directionally controlled movement of the worktable 30, including shifting rod 109 and actuating member 110, is identical in construction, irrespective of whether the manual control assembly 64 is secured to the saddle or the unitary automatic electro-hydraulic control 59, FIGS. 1 and 9, is secured to the saddle. Whenever the machine is to be manufactured for manual operation only, the manual control assembly 64, FIG. 8, is secured as a unit to the saddle 29 by bolting a mounting plate 113 directly to the saddle 29. As this is done, it will be apparent in FIG. 8 that the actuating tongue 111 will then be moved into engagement with the vertical slot 110B presented by the outward projecting fork 110. Actuating tongue 111 is secured to a central hub 112 journalled in an outward extension of the mounting plate 113, and that is provided at its outer end with a manually movable directional control lever 114. Thus, leftward movement of directional lever 114 will effect rightward movement of clutch fork 108 to move the clutch spool 107 into driving engagement with clutch element 80 for effecting leftward movement of the worktable 30. In a similar manner, the manual directional control lever 114 is shiftable rightwardly to effect rightward movement of the worktable 30. In either of its shiftably adjusted positions, a resiliently biased detent mechanism is operative in well known manner to retain directional lever 114 and actuating tongue 111 in their selected left, neutral or right positions.

Normally, whenever feed drive motor 89 is energized, engagement of the manual directional lever 114 initiates movement of the worktable at feed rate. In machines equipped with manual control only, the feed drive clutch 102 is normally engaged and the rapid traverse clutch 106, FIG. 7, is normally disengaged. To change the rate of table movement from feed to rapid traverse, it is then necessary to manually actuate a rapid traverse control lever illustrated in FIG. 12 constituting a part of the manual rapid traverse control assembly contained within a separate housing, schematically illustrated within the dotted lines as 64A. In machines equipped with manual control only, the valve carrying housing 64A, FIG. 12, is secured to the right face of the knee 36, FIG. 1, in lieu of the solenoid valve controlled housing 63, thereshown. In either case, the operating structure and components within the hollow knee 26 is identical, and either the manual valve containing housing 64A or the housing 63 is secured to the side face of the knee 26 in a manner to overlie a transverse opening (not shown) contained in the right side wall of the knee. Thus, the operating mechanism contained, either within the housing 64A or 63 is connectable to actuate operating mechanism shown within the hollow knee 29 and including the motor 89, FIG. 7, together with the cooperating feed and rapid traverse drive trains, and selectively engageable clutches 102 and 106.

In the event the machine is to be manufactured with the improved automatic control system disclosed in this invention, the improved unitary electro-hydraulic control unit 59 is secured directly to the front face of the saddle 29, as shown in FIG. 9, in a manner to overlie the lateral opening 110A formed in the front saddle wall. As there shown, the control unit 59 comprises a main support block 120 integrally with flanged mounting plate 121, the latter being secured directly to the front saddle wall. The interior of the support block 120 is provided with an enlarged upper recess or cavity 123, as shown in FIGS. 9 and 10, and a lower recess or cavity 124, the latter opening directly into the lateral opening 110A provided in the front wall of the saddle 29. An upper bored opening extending through the support block 120 is adapted to provide relatively small diameter hydraulic cylinders 125 and 126 spaced apart on either side of the upper recess 123. As shown in FIG. 9, the cylinders 125 and 126 respectively open into enlarged circular openings 127 and 128, cooperating therewith to constitute two spaced apart cylinders of stepped diameter. The outer ends of each stepped cylinder are closed by cover plates 134 and 135 secured to the opposite side faces of the support block 120.

A control lever piston 136 of corresponding small diameter is slidably constrained for axial movement within the spaced apart small diameter cylinders 125 and 126. The directional control lever piston 136 is provided with opposite ends of reduced diameter that are respectively encircled by centering springs 137 and 138 having their outer ends seated within circular recesses formed on the inner faces of the cover plates 134 and 135. At their inner ends, the springs 137 and 138 respectively abut centering washers 139 and 140. Inward movement of washers 139 and 140 is limited by engagement with the flanged circular shoulders presented by the inner ends of the enlarged circular cylinder openings 127 and 128. In the absence of hydraulic pressure fluid to the outer ends 127, 128 of the stepped hydraulic cylinders, it will be apparent that springs 137 and 138 cooperate with the associated washers 139, 140 to urge the directional piston 136 to a central neutral position with respect to the support block 120. Movement of piston 136 effects corresponding movement of an actuating cam block 143 pinned to the central portion of the piston for both axial and pivotable movement therewith.

For effecting manual axial movement of the piston 136, the forward portion of the cam block 143 is provided with a circular opening that is engaged by a semispherical end 145 carried at the inner end of a table directional lever 146. A spherical enlargement formed toward the forward central portion 147 of the lever 146 is seated within a complementary recess formed in the support block 120 and is retained therein by a front cover late 148. Thus, the spherical enlargement 147 of lever 146 permits universal pivotable movement of the lever relative to support block 120, and a similar universal pivotable movement of the spherical end 145 relative to the cam block 143 together with directional piston 136, the latter cooperating with cylinders 125 and 126 to constitute a journal and axial guideway for the cam block 143. Thus, movement of the lever 146 is operative to move the cam block 143 and piston 136 axially and pivotally.

To initiate table movement in a leftward direction, the directional lever 146 is swung leftwardly to the piston illustrated in FIG. 9. This causes rightward movement of the directional piston 136 in opposition to the spring 138, and causes the cam block 143 to be moved rightwardly in a manner that the right side face actuates a table left directional switch 151. The table left directional control switch 151 is secured and confined within an appropriate recess in the support block 120 in spaced apart relationship to a table right directional control switch 152 likewise confined, as shown in FIG. 9. Movement of the directional control lever 146 to its central neutral position, shown in FIG. 11, effects corresponding movement of the cam block 143 to a neutral position out of active engagement with either table left switch 151 or table right switch 152. Pivotable movement of the directional lever 146 to its extreme rightward position effects leftward movement of the cam block 143 to actuate the table right directional control switch 152, so that the directional swinging of the lever 146 always corresponds to the direction of movement of the work supporting table.

To effect rapid traverse movement in selected direction, the table directional lever 146 is first pivoted in the required direction of movement, for example, leftwardly as illustrated in FIG. 9, and then pivoted upwardly. Thus, initial leftward movement of the lever 146 moves the cam block 143 rightwardly to actuate the left directional switch 151; and, pivoting the lever upwardly pivots the cam block 143 in counterclockwise direction to dotted line position to activate a rapid traverse switch 153, FIG. 10. In FIG. 10, cam block 143 is represented in solid lines as being in neutral downward position. It will be apparent that lifting the outer end of the directional lever 146 effects counterclockwise pivoting movement of the cam block 143 to bring a cam surface 154 presented thereby upwardly to permit actuation of rapid traverse switch 153. It is emphasized that directional lever 146 can be pivoted upwardly in one of three distinct positions, including neutral, extreme leftward, or extreme rightward.

Pivoting lever 146 upwardly in its central neutral position activates the rapid traverse switch 153 for providing rapid traverse movements to the knee 26 and the saddle 29 providing the corresponding directional control levers 27 and 28, FIG. 1, are engaged. The actual directional clutches activated by the knee directional control lever 27 and saddle directional control lever 28 and the power distributing trains for moving the knee 26 and saddle 29 are not illustrated in this disclosure. The general arrangement for supplying power to move the knee 26 and saddle 29, however, is similar to that illustrated in FIG. 7 with the feed drive motor 89 constituting a source of power for moving these two members. As will hereinafter be more fully explained, it will be apparent that pivoting the directional lever 146, FIG. 10, upwardly in neutral position has no effect on movement of the worktable 30 even though rapid traverse switch 153 is activated. The arrangement of the control lever 146 and switch actuating cam block 143 is such as to preclude titling the lever upwardly in neutral position, and then moving it to its extreme left or rightway positions for effecting worktable movement. To this end, a slot 158 formed in the underside of cam block 143 is disposed to coact with a spring biased latching plunger 159 having its upper end normally extending to a point slightly below the underside of cam block 143 and out of engagement with the latching slot 158 formed therein.

As shown in FIGS. 10 and 10A, the latching plunger 159 is carried within a stepped circular opening presented in the underside of the support block 120. A flange secured to the central portion of the plunger 159 is normally urged into engagement with a circular shoulder formed in the recess by a spring 161 seated at its outer end against a threaded plug 162. Normally, a plunger 165 biased forwardly by a spring 167 seated against the cover 145 engages a cam surface 168 of the switch operating cam block 143, urging it to rotate in a clockwise direction as viewed in FIG. 10, in a manner that the rear underside thereof is out of engagement with latching plunger 159. The extreme forward rightside 169 of cam block 143 slidably engages an abutment surface 170 of the support block 120 which limits clockwise movement thereof an precludes downward movement of the directional handle 146. Upon upward tilting movement of lever 146, the notch 158 engages plunger 159 to prevent rightward or leftward movement of the directional lever 146. The cam block 143 is then moved to the dotted line position indicated in FIG. 10, permitting forward movement of a plunger 175 slidably carried by a bored opening in a switch support block 176. Forward movement of plunger 175, in turn, permits actuation of switch 153.

The resiliently biased latching plunger 159 thus prevents rightward or leftward movement of manually operable directional lever 146 from its upwardly tilted neutral position. This prevents abrupt clashing engagement of the axially movable clutch spool 107, FIG. 7, with either of the clutch elements 79 or 80 at the moment these elements are rotating at their full rapid traverse rates. To effect manually initiated table movement at a rapid rate, therefore, it is necessary that the directional lever 146 be returned to its downward, neutral postiion, after which it can be moved leftwardly or rightwardly through a table feed position and then pivoted upwardly to effect rapid traverse movement of the table in the selected direction.

Assume now that the directional lever 146 is in its leftward position and tilted upwardly to activate both switch 151 and switch 153, as shown in FIGS. 9 and 10. As the lever is moved leftwardly, the locking slot 158 is moved out of registration with the resiliently biased latching plunger 159, as shown in FIG. 10A. With this condition existing, and the lever tilted upwardly, the underside of the switch actuating cam block 143 operates to urge plunger 159 downwardly in opposition to spring 161. With this condition existing, latching plunger 159 prevents reversal from rapid left to rapid right without first moving the directional lever 146 to its downward neutral position. For example, retaining the directional lever 146 in its upper position and moving it from left to right causes movement of the cam block 143 to move the slot 158 into registration with the plunger 159 which is then urged upwardly by spring 161 into latching engagement with the notch, thus preventing further rightward movement of the directional lever. With this occurring, it will be apparent the lever 146 must be returned to its downward neutral position to disengage the cam block 143 from plunger 159, before moving the lever 146 to its rightward upward position.

As shown in FIGS. 9 and 11, the opposite ends of directional lever cylinders 125 and 126 are interconnected in parallel with a pair of larger diameter clutch actuating cylinders 171 and 172. The outer ends of cylinders 171 and 172 are of enlarged diameter to provide shoulders disposed to coact with the circular flanged ends of tubular centering sleeves 173 and 174, respectively constrained for axial slidable movement within the cylinders. A clutch actuating piston 177 is carried for axial slidable movement within the tubular sleeves 173 and 174, and has fixedly secured to its central portion a clutch actuating member 178. Clutch actuating member 178 is provided at its outer end with a tongue 179 engageable with the vertical slot presented by the actuator 110, as shown in FIG. 9 and in the hydraulic control system shown in FIG. 3.

Admission of hydraulic fluid at the same pressure from parallel supply lines 183 and 184 transmits pressure fluid in substantially equal pressures to the opposite ends of the cylinders 171 and 172. As this occurs, the flanged sleeves 173 and 174 are urged inwardly until their flanged outer ends 185 and 186 engage the stepped circular abutments of cylinders 171 and 172. At this time, the inner ends of tubular centering sleeves 173 and 174 simultaneously engage the opposite side faces of clutch actuating member 178 to retain the actuating rod 109, FIGS. 8 and 9, as well as the axially shiftable clutch spool 108, FIG. 7, in neutral disengaged position. Thus, the piston 177 secured to actuating member 178, FIGS. 9 and 11, is also retained in central neutral position with respect to the cylinders 171 and 172. As clearly shown in FIG. 11, pressure supply lines 183, 184 are respectively connected via branch conductors 185 and 186 which are connected to the opposite ends of directional piston cylinders 125, 126. Thus, whenever fluid pressure is transmitted to both of the supply lines 183, 184 the directional lever piston 136 is likewise returned to a central neutral position, and retained thereby both by pressure fluid and by means of the cooperating centering springs 137, 138 and centering washers 139, 140 respectively. The arrangement is such that if pressure is interrupted to both of the lines 183, 184 while the machine is in operation and the worktable moving in selected direction, the springs and washers 139 and 140 automatically return piston 136 and manually operable directional lever 146 to neutral position. With the lever 146 returned to neutral, reactivation of the machine will not effect resumption in table travel in the originally selected direction.

Portions of the input pressure supply lines 183 and 184 extend through flexible lines 61 and 62 which are indicated more clearly in FIG. 1 as interconnecting the unitary control assembly 59 secured to the front face of the saddle with the unitary solenoid valve housing 63 secured to the side face of the knee 26.

Whenever the machine is activated for operation in either manual or automatic mode, hydraulic fluid under pressure is transmitted to supply lines 183 and 184 to maintain both actuating piston 177 and directional control piston 136 in central neutral position as shown in FIG. 11. Because of the relatively small diameter of piston 136, the directional control lever 146 is movable from neutral to either rightward or leftward position in opposition to pressure fluid in branch supply lines 185 and 186. As will hereinafter be more fully described with reference to the electrical control circuit, FIG. 14, initiation of table movement in selected direction is effected by movement of cam block 143, FIG. 9, into engagement with one or another of the directional control switches 151 or 152. Upon actuation of one or another of switches 151 or 152, the electrical control circuit is operative to effect selective actuation of a solenoid controlled directional valve 189, connecting one of the lines 183 or 184 to exhaust, and the other of these lines to fluid pressure.

Assuming the machine to be operating at a selected speed, with the table drive clutch engaged and the manual control lever 146 in neutral position, then in the event lever 146 is moved rightwardly to initiate corresponding rightward table movement, hydraulic line 184 is immediately connected to exhaust while line 183 is connected to a supply of fluid under pressure, thus effecting immediate leftward movement of the clutch actuating piston 177 to connect the transmission for effecting rightward table movement. As this occurs, fluid pressure is transmitted via branch line 186 to directional cylinder 126, thereby retaining directional piston 136 in its extreme leftward position. Although manipulation of control lever 146 is necessary to initiate table movement in either direction, it is maintained in selected position by actuation of the associated electro-hydraulic control circuit. It is emphasized that lever 146 is always operative to override the functioning of the automatic control circuit. Therefore, even though the directional lever 146 is automatically retained in its rightward position, once rightward table movement has started, the lever 146 may be manually returned to neutral position to stop table movement, even though branch hydraulic line 186 is connected to pressure and line 185 is connected to exhaust during this described cycle of operation.

During automatic mode, once table movement has been started, subsequent changes in the direction and rate of movement are effected automatically by preselected actuation of pistons 136, 177 and rate change clutches 102, 106. As schematically represented in FIG. 11, a rate change valve 190 is selectively operative to effect engagement of either the feed change clutch 102 or the rapid traverse clutch 106 to effect a corresponding rate of table movement.

As shown in FIG. 11, hydraulic fluid to actuate the various control of elements is withdrawn from a sump 192 within the hollow knee 26 by means of a pump 193 connected to be driven by feed motor 89, and transmitted to a main pressure supply line 194. With an axially movable valve spool 195 of directional valve 189 in neutral position by means of centering springs 196 and 197, pressure fluid from the main supply line 194 is transmitted via ports in the valve spool 195 to the main supply lines 183 and 184 connected to simultaneously supply fluid under pressure for maintaining pistons 136 and 177 in their central neutral positions. Energization of the solenoid 205 effects rightward movement of the valve spool 195 in opposition to spring 197, thereby connecting the valve spool line 206 to transmit pressure fluid from supply line 194 to line 183, to effect immediate rightward movement of pistons 136 and 177, and effecting leftward movement of the worktable. At the same time, supply line 184 is connected via valve spool line 207 of the rightwardly urged valve spool to a return line 208 connected to exhaust fluid pressure from the rightward ends of pistons 136 and 177 to the sump 192.

Whenever solenoid 205 is de-energized, a solenoid 211 is energizable to effect leftward movement of the valve spool 195 in opposition to spring 196 to connect main supply line 194 via valve spool line 212 to the line 184 to urge pistons 136 and 177 leftwardly. At the same time, pressure fluid is exhausted from the opposite ends of the pistons via line 183, valve spool line 213 connected to the main exhaust line 208. With this condition existing, both of the pistons 136 and 177 are retained in their extreme leftward position, this condition being operable to effect rightward movement of the worktable 30 and rightward pivotable movement of the directional lever 146 to a position corresponding to the direction of table movement.

With solenoids 215 and 216 de-energized, a valve spool 217 associated with rate change control valve 190 is retained in central neutral position by means of centering springs 218 and 219 respectively. With the valve spool 217 in its center position, hydraulic lines 222 and 223 are connected via the channels in the valve spool 217 to a main exhaust line 220. Whenever the worktable is to be moved at a feed rate, solenoid 215 is energized to effect rightward movement of valve spool 217 in opposition to spring 219, connecting a valve spool line 225 to transmit fluid under pressure from main supply line 194 to the hydraulic line 222 connected to effect engagement of the feed drive clutch 102. At the same time, line 223 extending from the rapid traverse clutch 106 is connected via a now open check valve 226, the line 227, valve spool line 228 to the main exhaust line 220.

Whenever the rate of table movement is changed from feed to rapid traverse, solenoid 215 is de-energized and solenoid 216 is energized to effect movement of valve spool 217 to its extreme leftward position in opposition to spring 218. As this occurs, feed drive clutch 102 is immediately disengaged due to the fact that pressure fluid is exhausted from line 222 via valve spool line 231 to the exhaust line 220. With the valve spool retained in leftward position, pressure fluid is then transmitted from main supply line 194 via valve spool line 232 to line 227. This circuit is arranged in such a manner that check valve 226 blocks flow of pressure fluid which is then diverted via a branch line 233 through a throttle control valve 234 which operates to supply fluid of gradually increasing pressure to branch line 233 for effecting a gradual engagement of the rapid traverse clutch 106. The check valve 226 and throttle control valve 234 are operative upon starting rapid traverse to effect controlled admission of pressure fluid to hydraulic line 223 in a manner that clutch 106 is engaged gradually to prevent immediate shock loads upon the gears in the driving transmission. However, whenever the rate of table movement is changed from rapid to feed, line 223 is connected through the open check valve 226 to permit immediate disengagement of the rapid traverse drive clutch 106. For maintaining uniformity of pressure in the main hydraulic supply line 194, one end thereof is connected to a pressure regulating valve 238 in well known manner to by-pass fluid to a lubricating supply line 239. Supply line 239 is connected via another pressure regulating valve 240 which likewise is connected in well known manner to return excess fluid to the exhaust line 220.

In machines to be manufactured with manual control only, the rate change clutches 102 and 106, as well as the hydraulic pressure supply system contained within the hollow knee 26 are identical. In the case of machines with manual control only, however, a greatly simplified rate change valve housing 64A is secured to the side face of the knee 26 as hereinbefore explained. In machines adapted for manual control only, table movement at feed rate is initiated immediately upon rightward or leftward movement of the simplified directional control lever 114 associated with the manual control assembly 64 in FIG. 8. Whenever the directional lever 114 is actuated to effect engagement of clutch spool 107, rapid traverse rate is available by manual movement of a rapid traverse lever 244 pivotably mounted upon a side face of the manual valve control housing 64A. Manual movement of the lever 244 actuates linkage 245 to effect rightward movement of a valve spool 246 in opposition to spring 247, carried within a manual control valve 249. With the valve spool 248 manually retained in rightward position, pressure fluid from the main supply line 194 within the knee is connected via a valve spool line to transmit fluid under pressure to supply line 223 connected to effect engagement of rapid traverse clutch 106. Likewise, feed clutch supply line 222 is then connected via line 252 in the valve spool to the main exhaust line 220. With the simplified manual control system, releasing rapid traverse lever 244 permits resiliently biased leftward movement of the valve spool 248, reconnecting pressure supply line 194 to line 222 for re-engaging the feed drive clutch 102; and, connecting rapid traverse clutch line 227 to the main exhaust line 220.

Figure 14:
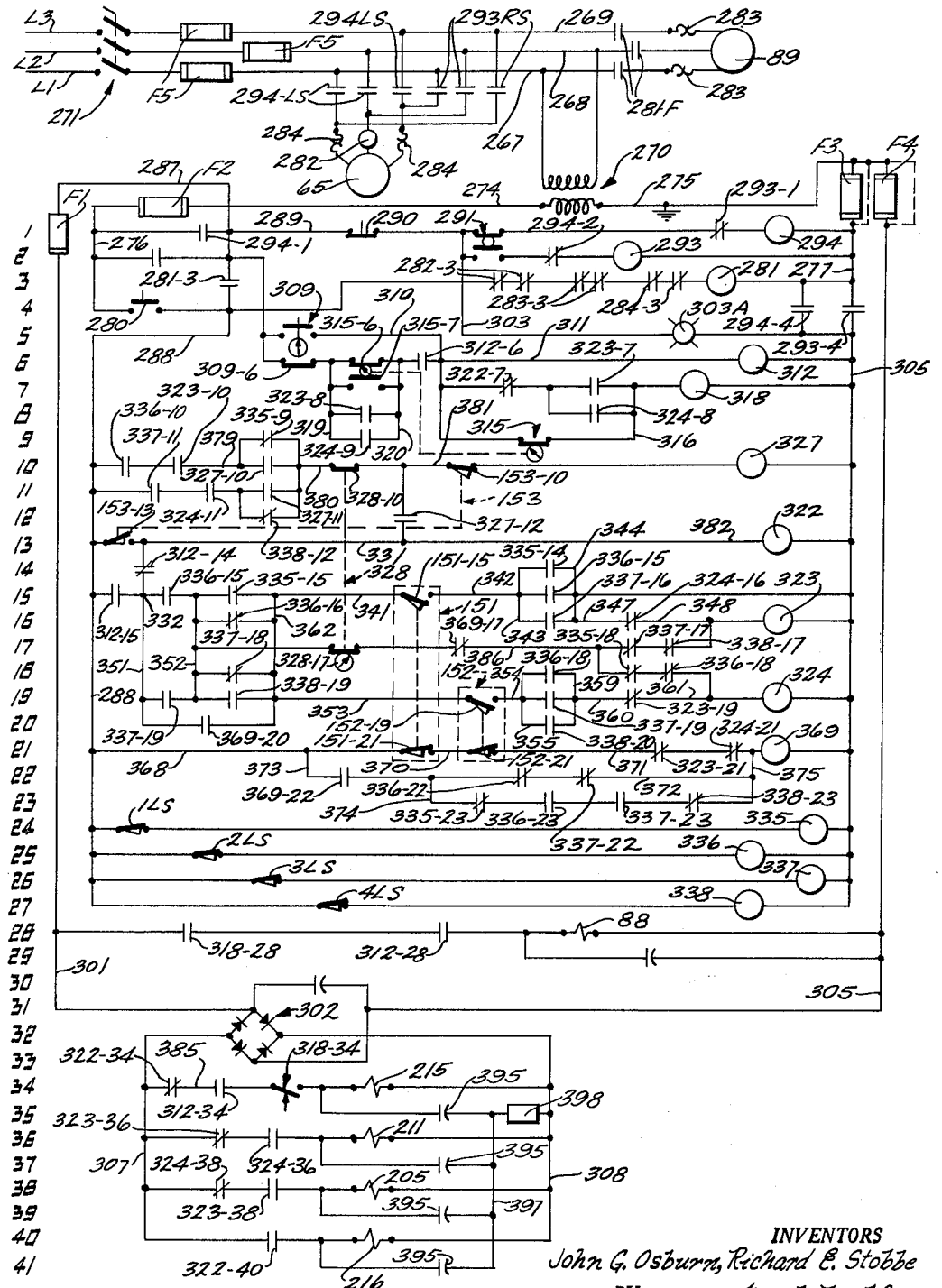
FIG. 14 is a schematic electrical circuit diagram for energizing the machine drive motors and controlling automatic cycle operation of the worktable; and, FIG. 15 is a chart correlating operation of the coded trip dogs and the switches actuated thereby, as well as the functions initiated by coaction between the dogs and switches.

The electrical supply and control system diagrammatically illustrated in FIG. 14, shows that power is furnished from three phase electrical power lines $L_1$, $L_2$, $L_3$ connectable to energize the spindle motor 65 and table feed motor 89 and, by way of a transformer 270, at reduced voltage, to the control system. A fused disconnect switch 271 controls connection of the power lines $L_1$, $L_2$, $L_3$ to conductors 267, 268 and 269. The secondary winding of the transformer 270 supplies electric current of reduced voltage directly to a main control horizontal conductors 274, 275 connected to main control vertical conductors 276, 277.

For convenience in locating the elements of the control system in FIG. 14, the remaining horizontal conductors are separately numbered beginning at 1, in a column of numbers at the left of the drawing and in line with such conductors, and the number of the horizontal conductors where a particular element is to be found, is used as a suffix to the reference numeral. For example, spindle motor relay 294 in line 1 is provided with associated contacts 294–1, 294–2 and 294–4 respectively located by reading rightwardly along lines 1, 2 and 4.

With the machine energized by closure of disconnect switch 271, the electrical control system can be activated for operation by momentarily depressing master start switch 280, completing a circuit from energized conductor 276 along line 4 to energize a feed motor relay 281 connected at its opposite terminal to energized line 277. Interconnected in series with line 4 to the feed motor relay 281, there are provided the usual normally closed overload contacts 282–3, 283–3 and 284–3 respectively having their coils interconnected in the power supply lines to the feed motor 89 and the spindle motor 65. Energization of the feed motor relay 281 to closed position, effects closure of contacts 281–F to transmit power from input power lines 267, 268 and 269 to the power supply lines connected to effect energization of the feed motor 89. A normally open contact 281–3 adjacent the momentarily depressed start button switch 280, is moved to closed position bridging a circuit from a vertical conductor 287 to energize a line 288.

The control circuit for energizing the spindle motor 65 is completed from energized conductor 276 via the still closed master start button contact 280, conductor 288, closed contact 281–3 to conductor 287; and thence via conductor 289, line 1, normally closed stop button switch 290, the closed upper contact of spindle directional switch 291, a normally closed contact 293–1 to energize the spindle left relay 294. Normally closed contact 293–1 is associated with a relay 293, line 2, which is energizable to effect rightward rotation of the spindle motor whenever the spindle directional switch 291 is adjusted to complete the circuit to this relay instead of spindle left relay 294. Upon energization of spindle left relay 294, a contact 294–1 is closed to complete a circuit from energized conductor 276 to conductors 287 and 289. Upon releasing the momentarily depressed master start button switch 280, it will be apparent that the circuit for maintaining the feed motor relay 281 energized is completed via the closed contact 294–1 of the energized spindle left relay to conductor 287, closed contact 281–3, conductor 288 and line 4 to the relay coil 281. Energization of spindle left relay 294 effects closure of three normally open contacts 294–LS to transmit current from power supply conductors 267, 268 and 269 to the conductors connected to effect leftward rotation of the spindle motor 65. Closure of energized spindle left relay 294 likewise effects movement of another normally open contact 294–4 to closed position, completing a circuit from energized conductor 277 via horizontal conductor 303, line 5 to energized control conductor 305, thus energizing signal light 303A.

From the energized control conductor 275, a conductor 305 is connected to transmit current to one input terminal for a rectifier bridge circuit 302 having its opposite input terminal connected via energized conductor 301 to the now energized conductor 287. The rectifier bridge circuit 302 is operable in well known manner to supply via its output terminals a continuous supply of direct current to the vertical conductors 307 and 308, for effecting selective energization of the various control solenoids 215, 211, 205 and 216 as will hereinafter be more fully described.

With the feed motor 89 and spindle motor 65 both energized to rotate, the machine is operable to effect selective rotation of the tool spindle and the work supporting table. Rotation of the tool spindle is initiated by momentarily depressing a spindle start button switch 309, line 5, completing an energized circuit from conductor 287, to a conductor 310 connected via horizontal conductor 311 to effect energization of a spindle start relay 312, line 6. At the same time, with an automatic spindle stop switch 315, line 9, position in "off" position, a circuit is completed from conductor 310 via closed contact bar of switch 315, to line 9, to a conductor 316 connected to effect energization of a spindle stop timer relay 318, line 7. With this condition existing, i.e. relays 312 and 318 both energized, a circuit is then completed along line 28, FIG. 14, via the now closed contact 318–28 of energized relay 318 and closed contact 312–28 of energized relay 312 to effect energization of spindle control valve solenoid 88. As hereinbefore explained with reference to FIG. 1, energization of solenoid 88 actuates spindle control valve 73 to disengage the spindle brake 72 and engage the drive clutch 69 for effecting continuous rotation of the tool spindle 23. With the automatic spindle stop switch 315, line 9 in FIG. 14, in the "off" position as shown, the tool spindle is energized for continuous rotation irrespective of whether the worktable is moved at a feed or rapid traverse rate. In the event the spindle stop switch 315 is rotated to its "on" position while the tool spindle is connected for operation as hereinbefore described, the circuit to relay 318 will be immediately interrupted to effect movement of contact 318–28, line 28, to open position, thus de-energizing the spindle control solenoid 88. This will necessitate restarting the tool spindle by again momentarily depressing start button switch 309, line 5.

With automatic spindle switch 315 in its "off" position, the holding circuit for retaining relays 312, 318 energized to effect continuous spindle rotation is completed via conductor 311, closed contact bar 312–6 of energized relay 312, the closed contact bar 315–6 of stop switch 315, and thence via a normally closed lower contact bar 309–6 of the spindle start switch 309.

Whenever the automatic spindle stop switch 315 is positioned in the "on" position, the contact bar associated therewith in line 9 is moved to open position. During this condition of operation, the tool spindle 23, FIG. 1, is disposed to be connected for rotation during feed movements of the machine and is braked to a stop during rapid traverse movements. To achieve this result, energization of relay 318, line 7, is effected only during feed movements. De-energization of relay 318 to stop feed movements is then effected whenever a normally closed contact 322–7 is moved to open position upon energization of a rapid traverse control relay 322, line 13, for effecting rapid traverse machine movements as will hereinafter be explained. De-energization of relay 318 during rapid traverse of the worktable, effects movement of the associated contact 318–28 in line 28 to open position, thus de-energizing spindle control solenoid 88, permitting hydraulically actuated re-engagement of the spindle brake. Upon closure of contact 322–7 to re-energize relay 318 when resuming feed rate, a time delay contact 318–34 activated by relay 318 delays re-energization of the feed control solenoid 215, until the spindle motor resumes full operating speed.

With the automatic spindle stop switch 315 in its "on" position, the contact bar 315–6 is moved downwardly to open position and contact bar 315–7 is moved into bridging engagement between conductors 319 and 320. Thus, with this condition existing, initial actuation of spindle start switch 309 completes a starting circuit to effect energization of spindle relay 312, a holding circuit then being completed via conductor 311, closed contact 312–6, conductor 320, contact bar 315–7, conductor 319 and the lower contact bar 309–6. Although spindle relay 312 is energized, the spindle is not connected for rotation until the table is connected for feed movement in a leftward or rightward direction. Feed movement of the table is initiated by energization of a table left control relay 323, line 16, or energization of a table right control relay 324, line 19. Energization of one or the other of relays 323 or 324 effect closure of respectively associated contacts 323–8 or 324–9, as well as contacts 323–7 or contact 324–8. Thus, after spindle relay 312 is energized, during automatic spindle stop operation, closure of the normally open contacts respectively associated with relays 323 or 324 effects immediate energization of spindle stop timer relay 318 to energize the spindle control solenoid 88, line 28.

For effecting movement of the worktable in response to either manual movement of directional lever 146, FIG. 9, or automatically in response to coded operation of trip switches 1LS to 4LS inclusive in FIG. 14, a selector switch 328 is movable to either manual or automatic mode position. In automatic mode, switch 328 is positioned to move associated contacts 328–17 and 328–10, lines 17 and 10 respectively, into bridging engagement with associated conductors. When conditioned for operation in automatic mode, the worktable is responsive to either manual or automatic control, with automatic changes in rate and direction of movement taking place in accordance with the adjusted position of the table trip dogs. In manual mode switch 328 is positioned to move associated contacts 328–17 and 328–10 to open circuit interrupting position, thus precluding automatic reversal and automatic continuance of rapid traverse movement upon coded actuation of the limit switches trip dogs, as illustrated in FIG. 15.

In either manual or automatic mode, it is possible to effect rapid traverse movement of the worktable in selected direction, assuming the machine is activated for operation and both feed motor relay 281, line 3, and spindle motor relay 294, line 1, are energized. It will now be assumed that spindle control relay 312 is de-energized, and its associated contacts 312–15 and 312–14 are positioned as shown in FIG. 14. In other words, with spindle relay 312 de-energized, contact 312–15 is in open circuit interrupting position, and contact 312–14 is in its normally closed position completing a circuit from conductor 331 to junction point 332. With these conditions existing, rapid traverse movement of the worktable in a left direction is effected by moving directional control lever 146, FIG. 9, leftwardly to activate switch 151, and the pivoting the lever upwardly to actuate rapid traverse control switch 153. Rapid traverse movement of the table in leftwarr direction will then continue as long as the directional lever 146 is manually retained in leftward, upwardly tilted position, or until one or another of the trip dogs actuates a switch to automatically interrupt this manually initiated circuit.

Referring now to FIG. 14, initial leftward pivotable movement of directional lever 146 conditions a circuit for effecting energization of table left relay 323, this energization being effected upon upward pivottable movement of lever 146 to actuate switch 153 to simultaneously effect energization of rapid traverse relay 322. Initial leftward movement of the control lever completes the circuit from conductor 331, via normally closed contact 312–14 to junction point 332 and thence along line 15 via the closed contact 336–15 of energized relay 336, line 25, and through closed contact 335–15 of energized relay 335, line 24, to conductor 341. With table left switch 151 activated in response to leftward movement of the lever 146, an upper contact bar 151–15 associated therewith is moved to closed position completing a circuit to conductor 342. Conductor 342 is connected via vertical conductor 343 and one or another of contacts 335–14, 336–15, and 337–16; depending upon which of the associated relays 335, 336 and 337 is energized, to conductor 347.

The circuit continues from conductor 347 via a normally closed contact 324–16 of the table right relay 324 to a conductor 348 connected to one terminal of the coil for the table left relay 323. Although closure of switch contact 151–15 conditions this circuit for energization of relay 323, energization of relay 323 is not effected until directional lever 146 is pivoted upwardly in leftward position to actuate switch 153. Thereupon, a contact bar 153–13 is closed to complete the circuit from energized conductor 288 to conductor 331, the latter energized conductor then being connected to effect immediate energization of the table left control relay 323, line 16, and rapid traverse control relay 322, line 13.

Energization of the table left relay 323 effects closure of a contact 323–38 to complete a circuit from the energized D.C. conductor 307 via normally closed contact 324–38 to effect energization of the table left solenoid 205, this circuit being completed to the direct current conductor 308. At the same time, energization of the rapid traverse control relay 322 effects closure of a contact 322–40 to complete a parallel circuit from energized D.C. conductor 307 to energize the rapid traverse solenoid 216. As hereinbefore explained with reference to FIGS. 9 and 11, energization of direction valve solenoid 205 operates to effect hydraulically actuated rightward movement of piston 136 and clutch actuating piston 173, and energization of solenoid 216 effects hydraulically actuated engagement of rapid traverse clutch 106. Upon manually releasing the directional lever 146, spring biased plunger 165 in FIG. 10 returns the switch actuating cam block 143 to its clockwise starting position; and this in turn operates to deactivate rapid traverse control switch 153 to de-energize both rapid traverse relay 322 and table left relay 323. Thereupon, worktable left relay 323 is de-energized; directional valve solenoid 205, FIGS. 11 and 14, is likewise de-energized permitting resiliently biased return of the valve spool 195 to its neutral position, supplying fluid pressure to both the parallel connected lines 183 and 184. Thereupon, the directional lever 146, after being tilted downwardly, is automatically returned to its neutral starting position.

Prior to energization of the spindle control relay 312, line 6, it will be apparent that moving the directional lever 146, FIG. 9, upwardly in either leftward or rightward position will operate to effect rapid traverse table movement only as long as the directional lever is manually maintained in the selected position. After the spindle control relay 312 is energized to effect rotation of the tool spindle, or condition it for rotation, associated normally closed contact 312–14 is then moved to open position and normally open contact 312–15 is moved to closed position. Actuation of the directional lever to effect manual rapid traverse, with this condition existing, will provide rapid traverse. However, manually initiated rapid traverse in this condition of operation would normally be used to override the feed movement for momentarily increasing the rate of table travel.

To condition the control system for automatic cycle control, selector switch 328 is moved to the rightward, automatic mode position indicated in FIG. 14, moving assocated contacts 328–10 and 328–17 into closed position. With the selector switch 328 positioned as shown, and spindle control relay 312 energized, the control system and machine are now conditioned for either continuous or intermittent cycles of worktable movement with changes in both rate and direction of movement being automatically effected in accordance with the preset condition of the table trip dogs. With these conditions established, and the table 30 positioned relative to the trip post 58, as shown in FIG. 2, none of the coded trip control switches 1LS to 4LS inclusive will be engaged by any of the trip dogs secured to the front face of the table. Therefore, all of the trip switches 1LS to 4LS inclusive, as shown in FIG. 14, are retained in normally closed position to effect energization of trip control relays 335 to 338 inclusive.

It will now be assumed that the worktable is to be operated for split cycle milling operations, i.e. moving the table according to the cycle control chart schemtically illustrated in FIG. 2A. As there shown, it is assumed the table is started from a center, dynamic center stop position in which the stop "R" dog 46 is engaging the actuating plungers of trip switches 1LS and 4LS respectively. With this condition existing, of course, the table likewise will be shifted rightwardly in a manner that the dog 46 actually does engage switches 1LS and 4LS, this condition corresponding to the dynamic stop position illustrated in FIG. 2A. With the table in its center position, the directional lever is then moved leftwardly to initiate leftward movement of the worktable at a rapid rate, this portion of the cycle continuing from the center position until the left feed dog 42 engages trip switch 2LS, to reduce the rate of table movement from rapid to feed. Feed rate in a leftward direction continues until reverse dog 44 actuates trip switches 1LS and 2LS to effect reversal in the direction of table movement from left to right. As this occurs, the right rapid traverse dog 41 is engaged with trip switch 4LS to insure return rightward movement at a rapid rate, until stop "R" dog 46 re-engages limit switches 1LS and 4LS to again stop movement of the worktable 30 in its central neutral position.

As will hereinafter be more fully explained, engagement of stop "R" dog 46 with switches 1LS and 4LS not only stops table movement, but conditions the associated control circuit for resuming or restarting worktable movement in either direction at a rapid rate. As illustrated in the cycle chart in FIG. 2A, rightward movement of the worktable from the center stop position is then initiated by effecting manual rightward movement of the table directional lever 146. Thereupon, the worktable moves in a rightward direction at rapid rate until the preset feed right trip dog 43 momentarily engages limit switch 3LS to change the rate of table movement to feed rate for performing a milling operation. The worktable continues in a rightward direction at feed rate until the left reverse dog 45 momentarily engages limit switches 3LS and 4LS to effect reversal in the direction of movement. As this occurs, the preset left rapid dog 40 engages switch 1LS in a manner that the table is then moved at rapid rate in a leftward direction until dog 46 again engages limit switches 1LS and 4LS to stop worktable movement at its center, dynamic stop position.

The relatively simple intermittent cycle of worktable movements represented in FIG. 2A illustrates the function and operation on each of the enumerated trip dogs, as well as the coded operation of the limit switches 1LS to 4LS inclusive. It will be readily apparent that the various trip dogs can be secured to the table to secure a wide variety of different automatic cycles of worktable movement. For example, the dogs may be so positioned that the table moves through one continuous automatic cycle, as illustrated by the setting of the dogs in FIG. 1. Likewise, in such a case, rate change dogs may be positioned in a manner to effect several changes from rapid to feed rate and feed rate to rapid rate, as may be required to perform a plurality of milling operations on several different workpieces secured in spaced apart relationship to the worktable 30.

With the worktable being automatically moved during automatic cycle operation, coded activation of the switches 1LS to 4LS inclusive, FIG. 2, activates the improved electrical circuit, FIG. 14, and the coordinately operable hydraulic circuit, FIG. 11, to effect the preselected changes in rate and direction of worktable movement. For illustrative purposes, it will again be assumed the worktable 30 is being moved according to the cycle chart shown in FIG. 2A. To further illustrate the various conditions of operation within the control circuit, it will be assumed that the cycle has been interrupted in a manner that movement of the worktable 30 has stopped in the position represented in FIG. 2 relative to the trip post 58. To continue the rightward return movement of the worktable 30 to its center stop position, therefore, directional lever 146, FIGS. 9 and 11, is now moved rightwardly to activate table directional switch 152.

Thus, rightward movement of directional lever 146 completes a rightward feed starting circuit from energized-conductor 288, FIG. 14, via closed contact 312–15 of energized relay 312 to vertical conductor 351. Inasmuch as all of the relays 335 to 338 are energized at this time, the rightward starting circuit continues from conductor 351 via closed contacts 337–19 and 338–19 of energized relays 337 and 338 to a horizontal conductor; 353, along 19. From conductor 353, the right starting circuit continues via the closed upper contact bar 152–19 of the table right activated switch 152 to conductors 354, 355. This circuit continues from 355 via closed contact 337–19 of energized relay 337 to conductor 360, via the normally closed contact 323–19 of de-energized table left relay 323 to conductor 361 connected to effect energization of the table right control relay 324, connected at its opposite terminal to the energized supply line 305. Energization of the table right relay 324, in turn, effects closure of a normally open contact 324–36, line 36, to complete a D.C. circuit from energized line 307, via normally closed contact 323–36 to effect energization of the table right directional valve solenoid 211, FIGS. 14 and 11. Energization of table right solenoid 211 in turn effects connection of the main pressure line 194 of the supply line 184, FIG. 11, to effect immediate leftward shifting movement of clutch piston 177. At the same time, the flow of pressure fluid in branch line 186 operates to retain the directional control piston 136 in its extreme leftward position, thus retaining the table right directional control switch 152, FIGS. 9 and 14, in actuated position.

With these conditions existing, table rightward movement continues at feed rate until stop "R" dog 46 effects sequential actuation of switches 1LS and 4LS, stopping table movement in a dynamic stop position in a manner that the swicthes are retained in actuated position. As this occurs, FIG. 14, relays 335 and 338, lines 24 and 27 respectively are de-energized, thus effecting movement of the associated contacts 335–15 and 338–19 to their normally open position to immediately effect de-energization of the table right control relay 324. Inasmuch as control relays 336 and 337, lines 25 and 26, are retained in energized condition, the normally closed contacts 336–16 and 337–18 associated with these relays are likewise in open position. Therefore, upon opening of contacts 335–15 and 338–19, the energized circuit from vertical conductor 352 is interrupted to conductor 362 and 353. Upon de-energization of the table right relay 324, line 19, the contact 324–36 in line 36 is moved to its normally open position to effect de-energization of the table right directional valve solenoid 211. Thereupon, as hereinbefore described with reference to FIG. 11, the directional valve spool 195 is resiliently returned to neutral position to supply pressure fluid to supply line 183, as well as 184. As this occurs, the clutch actuating piston 177 is returned to neutral disengaged position and directional valve piston 136 is returned to its neutral position, thereby effecting deactivation of the table right switch 152, FIGS. 9 and 14.

At the same time table right control relay 324 is de-energized to stop table movement at the dynamic stop position, de-energization of control relays 335 and 338 operates to establish a circuit condition for restarting table movement by manual movement of directional lever 146 in either direction from the center stop position.

To effect this result, a restart relay 369 is energized in response to deactivation of switch 152, upon return of the directional lever 146 to its neutral position. This circuit is completed from energized conductor 288 along line 21, via conductor 368, a normally closed contact bar 151–21 to a conductor 370. Immediately upon deactivation of table right switch 152, the restart circuit is completed from conductor 370 via a lower closed switch contact 152-21 to conductor 371 and thence through normally closed relay contacts 323–21 and 324–21 to energize the restart relay 369. Energization of restart relay 369 completes a seal-in circuit from conductor 368, conductor 373, closed relay contact 369–22, to conductor 374. During the described restarting condition circuit, it will be recalled that switches 2LS, 3LS are closed and consequently relays 336, 337 are energized to retain the corresponding normally open contacts in line 23 in closed position. Inasmuch as the stop "R" dog 46 remains in engagement with switches 1LS and 4LS, relays 335, 338 are de-energized permitting the associated contacts in line 23 to return to their normally closed position. Thus, the seal-in circuit via conductors 374, 375 is provided to insure continued energization of restart relay 369, as long as stop "R" dog 46 remains in engagement with switches 1LS and 4LS. This is necessary, during restarting, inasmuch as either direction switch 151 or 152 are manually activated to re-initiate table movement in the selected direction, causing a consequent movement of their lower contact bars to open position.

Energization of restart relay 369 effects movement of normally closed contact 369–17 to open position, and movement of normally open contact 369–20 to closed position, to reconnect energized conductor 351 to vertical conductor 362. Energization of conductor 362 permits restarting of worktable movement in either direction, even though limit switches 1LS and 4LS are still retained in open position by engagement with the stop "R" dog 46.

With the worktable 30 moved rightwardly until the stop "R" dog 46 engages switches 1LS and 4LS, as hereinbefore described, the various circuit conditions for effecting the split, or interrupted, worktable movements will now be described as illustrated in FIG. 2A. Manual initiation of leftward table movement at a rapid rate is effected by moving directional lever 146 to its leftward position, as shown in FIG. 9. Thereupon, actuation of table left control switch 151 effects movement of its upper contact bar 151–15 to closed position to complete an energized circuit for energizing the table left control relay 323. At the same time, lower contact bar 151–21 is moved upwardly to circuit interrupting position, which would normally effect immediate de-energization of the restart relay 369. However, as table left movement is restarted in leftward direction, trip dog 46 remains in engagement with switches 1LS and 4LS to complete the seal-in circuit via conductor 373, closed contact 269–22, conductor 374 and thence via the now closed relay contacts to conductor 375 as hereinbefore described. Therefore, the left starting circuit is completed from energized supply line 288, via closed contact 312–15, conductor 351, and the now closed contact 369–20 of the energized restart relay 369 to conductor 362. The left starting circuit is continued from energized conductor 362, via conductor 341, closed contact bar 151–15 of manually actuated switch 151 to the conductor 342. The energized left starting circuit continues via closed contact 336–15 of energiezd relay 336 to conductor 347, the normally closed contact 324–16 of de-energized table right relay 324 to conductor 348 to effect energization of the table left starting relay 323.

At the same time, since the stop "R" dog 46 is disposed to effect restarting at rapid rate only, another circuit is simultaneously established to effect energization of rapid traverse control relay 322, and automatic rapid relay 327. During automatic mode, the manually actuatable rapid traverse start switch 153 is in deactivated position as shown in FIG. 14. Therefore, the upper contact bar 153–10 associated therewith is in its normally closed position. Thus, during restarting at a left rapid rate, energization of relay 323 effects closure of normally open contact 323–10 in line 10 completing a circuit from energized conductor 288 via the now closed contact 336–10 of energized relay 336 to a conductor 379. From energized conductor 379, the rapid traverse starting circuit continues via a normally closed contact 335–9 of the now de-energized relay 335 to a conductor 380, thence via the closed contact bar 328–10 to a conductor 381. From conductor 381, the starting circuit continues via the normally closed contact 153–10 to effect energization of the automatic rapid traverse control relay 327. Energization of relay 327 immediately completes a seal-in circuit by effecting closure of the normally open contact 327–10 to directly interconnect conductor 379 and 380, in a manner that this circuit remains established after movement of trip dog 46 out of engagement with limit switch 1LS which effects a subsequent energization of relay 335 to cause opening of contact 335–19.

Energization of the automatic rapid traverse relay 327 effects movement of a normally open contact 327–12 to closed position completing a parallel circuit from energized conductor 381 to conductor 382 to effect energization of the rapid traverse control relay 322. Energization of table left relay 323 and rapid traverse relay 322 effect corresponding energization of the table left directional valve solenoid 205, line 38, and rapid traverse control valve solenoid 216, line 40, as hereinbefore described. Thus, table movement in a leftward direction is immediately started at rapid rate, causing corresponding leftward movement of the stop "R" dog 46 out of engagement with switches 1LS and 4LS. As soon as dog 46 moves out of engagement with the trip plungers of switches 1LS and 4LS, these switches return to normally closed position, as shown in FIG. 14, to effect re-energization of relays 335 and 338. Thereupon, normally open contacts 335–15 and 338–19, lines 15 and 19 respectively are energized to closed position, completing an overlapping holding circuit from energized conductor 352 to conductor 362 in a manner that the table left relay 323 remains energized. At the same time, energization of relays 335, 338 effects movement of normally closed contacts associated with these relays in line 23 to open position, thus interrupting the seal-in circuit from conductor 374, permitting de-energization of the restart relay 369. As this occurs, contact 369–17 returns to its normally closed position and contact 369–20 returns to normally open position, to interrupt the shunt circuit connection between energized conductor 351 and 362.

As indicated in FIG. 2A, table movement continues in a leftward direction at rapid rate until the left feed dog 42 momentarily engages switch 2LS, effecting a corresponding momentary de-energization of relay 336. As this occurs, associated contact 336–10 is momentarily returned to normally open position interrupting the holding circuit from energized conductor 288 to conductor 379. Thereupon, both relays 327 and 322 are likewise de-energized. De-energization of rapid traverse control relay 322 permits return movement of normally open contact 322–40 to its normally open position to de-energize the rapid traverse directional valve solenoid 216. At the same time, contact 322–34 is returned to normally closed position, completing a circuit from energized D.C. conductor 307 to a conductor 385. Inasmuch as the spindle control relay 312 and the spindle stop traverse relay 318 are both energized, associated contacts 312–34 and 318–34 are in closed position. Thus, energization of conductor 385, line 34, effects immediate energization of the feed control valve solenoid 215 to provide an immediate change from rapid to feed rate of the leftwardly moving worktable 30.

Leftward movement of the worktable 30 at feed rate continues until the right reverse dog 44 effects sequential engagement of switches 2LS and 1LS, and corresponding de-energization of relays 336 and 335. Right reverse dog 44 is normally operative to effect reversal in the direction of table movement from left to right at feed rate. In the illustrated cycle, FIG. 2A, however, the right rapid traverse dog 41 is positioned in overlapping relationship with the right reverse dog 44. The effect of the illustrative placement of right rapid traverse dog 41 is to effect a reversed movement of the worktable 30 in a rightward direction at a rapid rate of travel. Even though switch 4LS is actuated by right rapid dog 41 in coordinated relationship with actuation of switches 1LS and 2LS, the switch 4LS is inoperative to initiate rapid movement until reversal in the direction of table movement is effected.

Actuation of switch 4LS presets the rapid traverse circuit condition by effecting deenergization of relay 338 to, in turn, permit movement of contact 338–12 to its normally closed position. Inasmuch as relay 337 remains energized during the described reversal to a rightward direction, contact 337–11 remains in energized closed position.

Activation of switches 1LS and 2LS, at the same time, effects de-energization of relays 335 and 336 to permit closure of associated contacts in line 18 to normally closed position to effect energization of the table right control relay 324. At the same time, all of the contacts associated with relays 335, 336 and 338 are returned to normally open or closed positions, during the interval in which these relays remain deenergized. The starting circuit for initiating rightward reversal is completed from energized conductor 288, via closed contact 312–15, conductor 351, closed contact 337–19 to conductor 352. From conductor 352, the reverse rightward circuit continues via closed contact bar 328–17 of the automatic mode switch 328 and thence via a normally closed contact 369–17 of the de-energized restart relay 369 to a conductor 386. From energizing conductor 386, the reverse rightward starting circuit continues via normally closed contacts 335–18 and 336–18 to the table right relay 324. Energization of table right relay 324 effects movement of an associated normally closed contact 324–16 to open position to deenergize the table left relay 323.

De-energization of table left relay 323 effects movement of contact 323–38 to normally open position to de-energize directional valve solenoid 205; and, energization of table right relay 324 effects closure of normally open contact 324–36 to energize the table right directional valve solenoid 211. Energization of this solenoid is not completed until contact 323–36 is returned to normally closed position upon de-energization of the table left relay 323. Since the table is being reversed to move in a rightward direction at rapid rate, energization of relay 324 effects movement of contact 324–11 to closed position to effect immediate energization of relays 327 and 322. The seal-in circuit for retaining relays 322 and 327 energized is completed by closure of contact 327–11 in line 11. Thus, normally open contact 322–40 is moved to closed position upon energization of relay 322 to effect energization of rapid traverse solenoid 216, at the same time that contact 322–34 is moved to open position to deenergize the feed rate solenoid 215.

In the interval during which reversal occurs, table left solenoid 205 is de-energized and table right solenoid 211 is energized, it will be apparent that directional lever 146, FIGS. 9 and 11, is moved from an extreme leftward to an extreme rightward position. Likewise, clutch actuating piston 177 is moved from extreme leftward to extreme rightward position to effect the required reversal in the direction of worktable movement. It will be further apparent, that automatic reversal and the position of directional lever 146 effects deactuation of table left control switch 151 and activation of table right control switch 152, FIGS. 9 and 14. Thus, prior to table right movement effecting movement of the reverse dog 44 out of engagement with switches 1LS and 2LS, an overlapping holding circuit is established to retain table right relay 324 energized by closure of directional switch contact 152–19. As dog 44 moves out of engagement with switches 1LS and 2LS, relays 335 and 337 are re-energized to effect movement of their normally closed contacts in line 18 to open position. However, relay 324 continues in energized condition due to closure of contact bar 152–19 which is hydraulically maintained in closed position.

Again referring to FIG. 2A, the table 30 is returned in a rightward direction at rapid rate to its dynamic center stop position. During return rightward movement, it will be apparent that the left feed dog 42 effects momentary actuation of switch 2LS and corresponding momentary de-energization of relay 336. During rightward table movement, energization of either the left switch 2LS or the left rapid switch 1LS has no effect upon the pre-established control circuit conditions.

Upon rightward movement of the worktable 30 to the dynamic center stop position, FIGS. 2 and 2A, the stop "R" dog re-engages switches 1LS and 4LS to immediately stop table movement and establish a circuit condition for restarting table movement by manual movement of directional lever 146. As hereinbefore explained, actuation of switches 1LS and 4LS effects de-energization of relays 335 and 338, FIG. 14, in a manner that the respective contacts associated with these relays are returned to their normal open and normal closed positions. The effect upon the control system is to effect de-energization of relays 327, 322 and 324 respectively positioned in lines 10, 13 and 19. As a result, table right solenoid 211, line 36, is de-energized to effect return movement of clutch actuating piston 177 and directional lever piston 136, FIG. 11, to neutral position. Movement of directional lever 146 to neutral effects deactuation of table right control switch 152, in a manner that upper contact bar 152–19 is moved to open position and lower contact bar 152–21 is moved to closed position. At the same time, rapid traverse rate solenoid 216 is deenergized. Likewise, a restarting circuit is effectuated by completion of the circuit along line 21 to effect energization of restart relay 369, a seal-in circuit for this relay being completed via closure of normally open contact 369–22 to conductors 374 and 375 as hereinbefore explained. The restarting circuit for continuing rightward movement is completed from energized conductor 351 via the now closed contact 369–20 of energized restart relay 369 to vertical conductor 362. Inasmuch as contacts 335–15 and 338–19 are returned to normally open position upon de-energization of relays 335 and 338, restarting of the table in rightward direction is effected through closed contact 369–20.

To resume movement of the worktable 30 in a rightward direction at rapid rate, the table directional lever, FIGS. 9 and 11, is moved to its rightward position to activate the table right control switch 152. As this occurs, the contact 152–19 associated therewith is closed to effect immediate re-energization of the table right relay which functions as hereinbefore explained to effect energization of the table right control valve solenoid 211, line 36. Table movement in a rightward direction is resumed at rapid rate, since energization of relay 324, line 19, effects closure of normally open contact 324–11 to complete an energized circuit from supply conductor 288 for effecting energization of relays 327 and 322, lines 10 and 13 respectively.

As hereinbefore explained, energization of the rapid traverse control relay 322 effects movement of contact 322–34 to open position to preclude energization of feed solenoid 215; and, effects closure of normally open contact 322–40 to effect energization of the rapid traverse valve solenoid 216. In spite of the fact that switch contact 152–21 is moved to open position upon restarting in a rightward direction, relay 369 is retained in energized condition until stop "R" dog 46 is moved out of engagement with switches 1LS and 4LS. This arrangement insures an overlap in the holding circuit to the table right relay, since re-energization of relays 335 and 338 as switches 1LS and 4LS return to closed position effects movement of normally open contacts 335–15 and 338–19 to closed position. Thus, an overlapping circuit is immediately established from energized conductor 352 to conductor 362 and conductor 353. As relays 335 and 338 are re-energized, the associated contacts in line 23 are moved to open position to permit de-energization of the restart relay 369 and movement of the associated contact 369–20 to normally open position. The overlap occurring upon restarting is of sufficient duration to preclude interruption of current flow from vertical conductor 351 to conductors 362 and 353.

Table movement in a rightward direction from the center stop position continues until the table right feed dog 43 momentarily engages switch 3LS. Actuation of switch 3LS, as shown in FIG. 14, effects de-energization of relay 337 and a consequent return movement of its associated contact 337–11 to normally open position, effecting de-energization of relay 327 and rapid traverse control relay 322. As this occurs, contact 322–40 returns to a normally open position to de-energize rapid traverse valve solenoid 216, and contact 322–34 returns to normally closed position to effect energization of feed control valve solenoid 215. As hereinbefore explained with reference to FIG. 11, de-energization of solenoid 216 and energization of solenoid 215 effects movement of directional valve spool 217 from extreme leftward to extreme rightward position. Thereupon, pressure fluid from supply line 194 is transmitted via spool line 225 to effect engagement of feed drive clutch 102, rapid traverse clutch 106 being then connected to exhaust via line 227 and spool line 228.

Movement of worktable 30 continues in a rightward direction at feed rate until left reverse dog 45 engages limit switches 3LS and 4LS. At the same time, left rapid traverse control dog 40 is moved into engagement with switch 1LS, this switch engagement being inoperative to effect a change to rapid rate until reversal in the direction of table movement is initiated.

Upon effecting reversal of table movement from right feed to left rapid, relays 335, 337 and 338 are all momentarily de-energized during the interval of reversal as long as corresponding switches 1LS, 3LS and 4LS remain in engagement with trip dog 40 and trip 45. Inasmuch as switch 2LS is not activated during this reversal, relay 336 remains energized and contact 336–10 is retained in energized closed position to condition a rapid rate leftward movement upon subsequent closure of normally open contact 323–10. As hereinbefore explained, subsequent closure of contact 323–10 completes a circuit for energizing relay 327 and rapid traverse control relay 322, the seal-in circuit being completed via closure of normally open contact 327–10.

Upon deenergization of relays 337, 338; associated contacts along horizontal line 17 are returned to normally closed positions, thus completing a circuit from energized conductor 386 to energize table left relay 323. The left reversing circuit is completed from energized line 288, the closed contact 312–15 of energized relay 312, and the closed contact 336–15 of energized relay 336 to vertical conductor 352. From energized conductor 352, the left reverse circuit is completed via closed contact bar 328–17 normally closed contact 369–17 to conductor 386. Energization of the table left relay 323, line 16, effects movement of normally closed contact 323–19 to open position to immediately effect de-energization of the table right relay 324. De-energization of relay 324, in turn, effects movement of contact 324–16 to normally closed position to condition a parallel holding circuit for retaining relay 323 energized upon subsequent movement of contacts 337–17 and 338–17 to open position.

De-energization of the table right relay 324 likewise effects movement of contact 324–36 to open position, de-energizing table right solenoid 211. Likewise, movement of contact 324–38 to its normally closed position re-establishes a circuit from energized D.C. conductor 307 via the now closed contact 323–38 of energized left relay 323 to effect energization of table left solenoid 205. Energization of table left solenoid 205 operates again to effect reversal in the position of pistons 177 and 136, FIG. 11, to their extreme rightward position for initiating table left movement. At the same time, in response to movement of directional piston 136, switch 152 is deactivated and switch 151 is activated, moving upper switch contact 151–15 into hydraulically maintained position. Thus, an overlapping holding circuit is established from conductor 341 and closed contact 151–15 to conductor 342 for retaining relay 323 energized, prior to re-energization of relays 337 and 338.

With table left relay 323 energized, normally open contact 323–10 is moved to closed position to re-energize relay 327 and rapid traverse control relay 322. Thus, relay contact 322–40 is moved from normally open to closed position to reenergize rapid traverse control solenoid 216. Likewise, relay contact 322–34 is moved to open position to preclude simultaneous energization of feed rate solenoid 215.

During leftward return movement of the worktable 30 to its dynamic center stop position, the table directional lever 146 is manually operative to override the pre-established circuit conditions.

For example, with the table moving in a leftward direction at rapid rate, the directional lever 146 is in extreme leftward position, as shown in FIG. 11. Even though table movement is under control of the automatic cycle control system, directional lever 146 is manually operative to change the rate from rapid to feed, or stop table movement completely. Pivoting the lever rightwardly to its neutral position deactuates switch 151, moving contact bar 151–15, FIG. 14, to open circuit interrupting position to effect immediate de-energization of the table left relay 323. This immediately effects deenergization of relay 327 and rapid traverse control relay 322, as well as de-energization of rapid traverse solenoid 216, line 40, and table left solenoid 205, line 38.

In the event the directional lever 146 is not manually manipulated to override the automatic control system, table movement continues in a leftward direction at rapid rate until the stop "R" dog 46 again reengages switches 1LS and 4LS to stop table movement in its dynamic center stop position. From this position, as hereinbefore described, directional lever 146 is again operable to effect resumption of worktable movement according to the requirements of the preset table trip dogs.

In the event the worktable 30 is inadvertently moved beyond its allowable range of movements, end limit dogs 38 or 39 are operable in accordance with the code chart in FIG. 15 to stop worktable movement. In the event worktable 30 moves in a rightward direction beyond its allowable limit relative to trip post 58, the limit dog 38 engages switches 2LS, 3LS and 4LS. This effects simultaneous de-energization of relays 336, 337 and 338 permitting associated contacts 336–18, 337–19 and 338–20 to return to their normally open positions thus interrupting the energized circuit to conductor 360 to de-energize relay 324. This condition not only immediately stops rightward table movement, but prevents re-energization of the table right relay 324 inasmuch as the end limit stop 38 is retained in engagement with switches 2LS, 3LS and 4LS. With this condition existing, directional lever 146 is leftwardly movable from neutral to move the worktable 30 back within its allowable range of travel, but is inoperable when moved rightwardly to effect further movement of the table in a rightward direction. Upon movement of end limit dog 38 into engagement with switches 2LS, 3LS and 4LS, de-energization of the corresponding relays effects return movement of the directional lever to neutral position, and movement of the lower switch contact bar 152–21 into circuit completing position. Thereupon, restart relay 369 is energized, with a seal-in circuit being completed via conductor 373 and now closed contact 369–22. Upon restarting the table in a leftward direction by actuating switch 151, lower contact bar 151–21 is moved into upper circuit interrupting position. Thereupon, the seal-in circuit to retain relay 369 energized is completed via conductor 374 and by normally closed contacts 336–22 and 337–22 to vertical conductor 375. Restart relay 369 is retained in energized condition until the now leftwardly moving worktable effects movement of the limit dog 38 out of engagement with switches 2LS, 3LS and 4LS. As this occurs, re-energization of relay 336 effects closure of normally open contact 336–15 to complete a circuit from junction point 332 to conductor 341 for retaining the table left relay 323 energized. Likewise, at the same time, energization of relays 336 and 337 effects movement of normally closed contacts associated therewith in line 22 to open position to de-energize the restart relay 369, effecting movement of contacts 369–20 and 369–22 to normally open position.

In the event the table is moved in a leftward direction beyond its allowable range of travel, limit dog 39 engages limit switches 1LS, 2LS and 3LS to effect simultaneous de-energization of relays 335, 336 and 337. Thereupon, associated contacts 335–14, 336–15 and 337–16 are moved to normally open position to interrupt the circuit to the table left control relay 323. Retention of relays 336, 337 and 338 de-energized simultaneously conditions a restarting circuit by effecting energization of the restart relay 369. Thus, with the table moved leftwardly beyond its allowable range of travel, a circuit is conditioned to preclude further leftward movement in response to manual operation of directional level 146. However, with this condition existing, the table can be returned in a rightward direction to its normal allowable range of movement by effecting rightward manual movement of directional lever 146 due to closure of contact 369–20 with restart relay 369 energized.

From the foregoing description, it will be apparent that the table trip dogs are positionable as shown in FIG. 2, to provide the split-cycle of worktable movements illustrated in FIG. 2A. It will likewise be apparent that the trip dogs can be repositioned within the table T slot 35 to provide different distances of rapid or feed rate, as well as a different complete length of table travel between the reverse dogs 45 and 44. With the stop "R" dog 46 entirely removed from its center position, the remaining dogs within the T slot 35 in FIG. 2 operate to produce a continuous automatic cycle. In such a case, no dynamic center stop position would be provided, and table movements would continue until the cycle would be stopped by manual movement of directional lever 146 to neutral position.

Alternatively, as shown in FIG. 4, a stop "F" dog 47 is secured within the table T slot 35, this particular dog normally being disposed to provide a dynamic center stop condition, with movement being resumed in either selected direction at a feed rate.

The cycle control chart represented in FIG. 4A illustrates the automatic cycle of worktable movements produced by securing the various trip dogs within the table T slot 35 in the manner illustrated in FIG. 4. The principal difference between the dog setting shown in FIG. 4 and that in FIG. 2, is that the stop "F" dog 47 is secured to the central portion of the worktable 30, with additional rapid traverse dogs 40, 41 spaced on either side of the center stop dog 47. The cycle shown in FIGS. 4 and 4A is for illustrative purposes only to exemplify the mode of operation of stop "F" dog 47.

It will now be assumed, that the worktable 30 is moving rightwardly at rapid rate in response to operation of the right reverse dog 45 and rapid traverse dog 41. This condition would exist, during an automatic cycle of operation according to a chart in FIG. 4A, and the worktable 30 was being moved rightwardly to the dynamic center stop position there shown. Stopping of the table is then effected by engagement of the stop "F" dog 47 with limit switches 2LS and 3LS respectively. Relays 336 and 337, FIG. 14, are then de-energized to effect a corresponding de-energization of relay 327, rapid traverse control relay 322, and table right relay 324. As hereinbefore explained with reference to the stop "R" dog 46, de-energization of the table right control relay 324 effects a subsequent de-energization of the table right solenoid 211, line 36, and a consequent movement of the directional lever 146 to neutral position to deactivate switch 152. Thereupon, a restarting circuit is again initiated by closure of lower contact bar 152–21 to effect energization of restart relay 369, with the seal-in circuit being established via closure of normally open contact 369–21. Engagement of the stop "F" dog 47 with switches 2LS and 3LS conditions the control circuit for resuming table movement in either direction at a feed rate only. During a dynamic stop condition, therefore, de-energization of relays 336 and 337 effects a corresponding movement of contacts 336–10 and 337–11 to normally open position, thus preventing energization of relay 327 and rapid traverse control relay 322 upon restarting table movement.

To restart table movement, directional lever 146 is again moved in a rightward direction to actuate switch 152 for effecting energization of table right relay 324 for resuming rightward table movement at feed rate. The starting circuit is completed from energized conductor 351 via the closed contact 369–20 of energized restart relay 369 to conductor 362 and conductor 353. As the rightwardly moving worktable 30 moves dog 47 out of engagement with switches 2LS and 3LS, at feed rate, relays 336 and 337 are again energized permitting closure of normally open contacts 336–15 and 337–19, completing a circuit from energized conductor 351 to conductor 353. As this occurs, the normally closed contacts associated with relays 336 and 337 are moved to open position to effect de-energization of restart relay 369, and movement of switch contact 369–22 to its normally open position. Rightward movement of the worktable then continues at feed rate until the rapid right dog 41 engages switch 4LS to effect momentary de-energization of relay 338, effecting movement of contact 338–12 to its normally closed position. Closure of contact 338–12 completes a circuit from energized conductor 288 to effect energization of relay 327 and rapid traverse control relay 322, with the corresponding de-energization of feed valve solenoid 215, line 34, and energization of rapid traverse valve solenoid 216, line 40. The distance the worktable 30 travels at rapid rate from dog 47 can be reduced considerably by placing the rapid dog 41 in extremely close proximity to the stop "F" dog 47. In a similar manner, leftward movement of the worktable 30 at feed rate from its center stop position may be initiated by effecting a corresponding manual leftward movement of directional lever 146. Similar circuit conditions are effected, excepting that the table left relay 323 is then energized upon leftward movement of directional lever 146, with corresponding energization of the table left valve solenoid 205, line 38.

The code actuated switches 1LS to 4LS inclusive, FIG. 4, are carried by a modified form of trip post 58A integrally formed with the unitary electro-hydraulic assembly 59. The switches 1LS to 4LS inclusive in FIG. 4 are disposed to coact with the presettable trip dogs there shown to perform automatic cycles of worktable movement as hereinbefore explained with reference to FIGS. 2 and 2A. As shown in FIG. 2, however, the end limit dogs 38 and 39 fixedly secured to the ends of worktable 30 coact in code fashion to respectively actuate three of the switches carried by the trip post 58. The automatic cycle control system illustrated in FIGS. 4, 5 and 6 is provided with a modified form of end limit stops including limit dogs 391 and 392 respectively disposed to coact with direct operating end limit switches 5LS and 6LS carried by the modified form of trip post 58A. Due to the changed configuration of the end limit dogs 391, 392, it will be apparent that reverse dogs 44 and 45 can be so secured to the table 30 as to permit full utilization of available table movement.

In other words, as shown in FIG. 4, the reverse dog 45 is so secured to the table 30 that the land presented thereby is positioned beneath the land presented by end limit dog 392. Likewise, with the end limit dogs 391 and 392, the T slot 35 is unobstructed at its opposite ends, permitting the dogs to be completely removed from the table T slot in simplified manner. Whenever the worktable 30 is moved rightwardly in response to energization of control relay 324, in either feed or rapid rate, engagement of end limit dog 391 with switch 6LS interrupts the holding circuit to energized control relay 324 to immediately stop rightward table movement. Inasmuch as switch 6LS is retained in open position by engagement with end limit dog 391, relay 324 is not then energizable in response to rightward movement of directional lever 146. In a similar manner, whenever worktable 30 is moved leftwardly in response to energization of relay 323 in limit dog 392 is positioned to engage switch 5LS to de-energize relay 323. In the event this occurs, directional lever 146 is rightwardly movable to effect return rightward movement of the worktable to a distance within its allowable range of reciprocable movement.

For retaining a trip dog in selected position along the worktable 30, each of the trip dogs are provided with a support block, such as the support block 393 in FIG. 5, disposed to slidably engage the table T slot 35. One or the other of the trip dogs, such as the reverse dog 45, in FIG. 5, is releasably clamped to the worktable in selected position by a screw extending through a bored opening in the dog 45 to threadedly engage the slidable support block 393.

It will be apparent that the electrical control circuit as schematically illustrated in FIG. 14 is provided with protective fuses and various other interlocking features. For example, fuses F1, F2, F3 and F4 are interconnected in the control circuit as shown in FIG. 14. Likewise, normally closed contacts 323–19 and 324–16 respectively associated with the table left relay 323 and the table right relay 324 are so positioned as to preclude simultaneous energization of the directional control relays. As hereinbefore explained, actuation of the normally closed contact 323–19 and 324–16 is utilized as a necessary functional step in the circuit operation upon reversal of worktable movement from one direction to the other. For arc suppression in the solenoid control circuit, a plurality of capacitors 395 are interconnected between the power supply conductors to the various clutch control solenoids and a common vertical conductor 397 to a resistor 398 to the energized D.C. conductor 308 in conventional manner.

One of the principal advantages of this invention is to provide a completely automatic cycle control system for the movable work support of a machine tool. Irrespective of the position in which worktable movement is stopped relative to the trip post 58, manually initiated power driven movement of the table can be effected. This is the case regardless of which one, or combination of the limit switches 1LS to 4LS inclusive is engaged by one or another of the preset trip dogs at the moment table is stopped. Assume now that worktable movement is inadvertently stopped in such a position that reverse dog 45 and rapid right dog 40 simultaneously engage the actuating plungers of switches 1LS, 3LS and 4LS. As hereinbefore explained, as this occurs, control relays 335, 337 and 338 are de-energized to effect movement of their respectively associated contacts to normally open or normally closed position. With this condition existing, referring now to lines 15 to 19 inclusive, normally open contact 335–15 as well as normally open contact 338–19 are returned to normally open position as shown. Since control relay 336 is still energized, normally closed contact 336–16 is retained in open position. Therefore, normally closed contact 337–18 is the only available circuit path between conductors 352 and 362. Thus, with a control circuit available via normally closed contact 337–17, power driven movement of the worktable in a leftward direction may be initiated by actuating the directional lever 146 to effect corresponding closure of switch contact 151–15. In the event power driven movement from this position is not required, manual movement of the worktable may be effected by operating the table handwheel 33, FIG. 1, which is engageable by means of a clutch (not shown) to effect manual rotation of the table screw 31, effecting corresponding longitudinal movement of worktable 30. As manual movement of the worktable is effected in response to rotation of table handwheel 33, one or another of the preset trip dogs, shown in FIG. 2, may be moved into engagement with one or another of the limit switches 1LS and 4LS inclusive. Even though the electro-hydraulic control system is activated for operation, actuation of switches of 1LS to 4LS inclusive during manual table movement has no effect on the automatic control system when these switches are so activated. Thus, the electro-hydraulic control system provides a crank safe system for effecting continuous or intermittent cycles of worktable movement without any auxiliary mechanical linkage or separately operable disconnect switches that need to be actuated preliminary to effecting handwheel controlled table movement. At the same time, during an automatic cycle of worktable movements, the manually operative directional lever 146 is selectively operable to override the automatic control system momentarily, by changing the rate, the direction, or stopping of worktable movements. In the event it is necessary to override automatic cycle control, directional control lever 146 is again manipulatable to reinitiate automatic cycle control of the worktable movement for resuming automatic cycle control according to the preset positions of the various trip dogs along the front face of the worktable 30.

From the foregoing explanation of the construction and operation of preferred embodiments of the invention, it is apparent that there has been provided a greatly improved and simplified automatic control system for effecting selected changes in rate and direction of movement of the movable machine tool support member. The mechanical structure, cooperating hydraulic actuating control system, and associated electrical control circuit are so disposed as to constitute a completely new and greatly improved machine tool control system.

Although two principal embodiments of the invention have been shown and described, it will be apparent to one skilled in the art to which this invention relates, that various modifications in the manner of constructing the machine may be made without departing from the spirit and scope of the invention as defined in the subjoined claims.

The principles of this invention having now been fully explained in connection with the foregoing description, we hereby claim as our invention:

1. In a machine tool control system;
a reciprocable member;
power driven reverse clutch means selectively engageable from a non-driving neutral position to positions transmitting power to said member for driving said member in a selected one of two directions;
a power actuator mounted for movement in either direction from a neutral position;
power actuating means connected relative to said reverse clutch means and said power actuator to normally maintain said reverse clutch means in a neutral non-driving position and to maintain said actuator in neutral position or to effect selective directional movement thereof;
a manual directional lever connected to said power actuator to be moved by said power actuator when it is moved in either direction or to neutral, said lever itself being movable in either direction from neutral for moving said power actuator in a selected direction in opposition to said power actuating means;
a switch control circuit including interconnected control means located to be engaged and actuated upon movement of said lever in a selected direction from neutral, said switch means determining the said directional movement and, when actuated, controlling said power actuating means to maintain said actuator in selected directional position and simultaneously to effect engagement of said reverse clutch means for moving said member in a direction corresponding to the directional position of said lever;
code actuated reverse switch means interconnected in said control circuit for predeterminate operation in response to movement of said member during movement thereof to so operate said power actuating means as to effect movement of said actuator to its opposite position from neutral for reversing the directional position of said lever and simultaneously therewith to so operate said reverse clutch means as to effect reversed engagement thereof for moving said member in a reversed direction corresponding to the reversed directional position of said lever; and switch actuators adjustably secured relative to said member in position to effect selective actuation of said reverse switch means during movement of said member.

2. In reverse control system for a reciprocable machine tool member;
power driven reverse clutch means selectively engageable in either direction from a neutral position for transmitting power to said member for driving said member in a selected one of two directions;
a power actuator mounted for movement in either direction from a neutral position;
fluid drive means including control valves normally connecting said reverse clutch means and said power actuator to maintain said reverse clutch means in a neutral non-driving position and to maintain said actuator in neutral position or to effect selective directional movement thereof;
a manually operative directional control lever pivotably mounted and connected to said power actuator to be moved by said power actuator into a directional position corresponding to the selected direction of movement of said member, said control lever itself being manually movable in either direction from neutral for moving said power actuator in opposition to said fluid drive means;
a control circuit including switch means so positioned as to be selectively actuated by movement of said power actuator from neutral, said switch means being operatively connected with said valves for altering said connection to the clutch and actuator so that, when actuated said fluid drive means will maintain said actuator in selected direction and will effect selective engagement of said reverse clutch means for moving said member in a direction corresponding to the selected directional position of said actuator and its connected lever, said lever being capable of being manually moved during movement of said member to return said actuator to neutral position in opposition to said fluid drive means for deactivating said switch means and stopping movement of said member;
and reverse control means predeterminately actuated by said member during movement of said member for operating said valves to direct said fluid drive means to said power actuator for moving said power actuator to its opposite position from neutral thereby reversing the directional position of its connected lever and simultaneously actuating said switch means effecting reversed engagement of said reverse clutch means and correspondingly reversed movement of said member.

3. In a machine tool;
a reversibly movable work support;
power driven transmission mechanism for moving said support;
selectively engageable fluid pressure actuated reverse clutch means selectively engageable from a neutral non-driving position to transmit power from said mechanism to said work support to effect movement of said support in a selected direction;
a lever swingable in opposite directions from a neutral position into a position corresponding to the direction in which said support is to be moved by said reverse clutch means;
direction determining switch means so positioned as to be selectively actuated by the movement of said lever in either direction from its neutral position;
electro-hydraulic control means selectively actuated by actuation of said switching means in a manner to transmit pressure to said fluid pressure reverse clutch means to effect selective engagement of said reverse clutch means for moving said support in preselected direction;
a hydraulically actuatable device connected to said lever to be moved by manual movement of said lever from its neutral position and being connected in said electro-hydraulic control means to be moved by actuation of said electro-hydraulic control means in response to selective actuation of said switching means, said lever being manually swingable in selected direction from neutral to actuate said switch means for starting support movement in a corresponding direction;
and reverse control switching means predeterminately responsive to movement of said support during movement thereof and controlling said electro-hydraulic control means for effecting reversed engagement of said clutch means and reversed movement of said device,
whereby said member and said device connected lever are respectively moved in a corresponding reversed direction.

4. In a machine tool;
a reciprocable support;
power drive means for moving said support in either direction;

selectively engageable reverse clutch means operable to transmit power from said power drive means to said support for movement thereof in a selected direction;

a lever swingable in opposite directions from neutral position into a direction corresponding to the direction in which said support is to be moved;

direction control switch means selectively actuatable by movement of said lever in either direction from neutral to initiate support movement in a corresponding direction;

power actuating control means operative under the direction of said switch means to effect selective engagement of said clutch means for moving said support in preselected direction in response to selected actuation of said switch means;

a power actuated device connected to said lever and moved by said lever whenever said lever is moved from neutral for selectively actuating said switch means and being power operated by the actuation of said switch means to be urged in required direction during movement of said support for maintaining said lever in a direction corresponding to the selected direction of support movement;

and reverse control means actuated by said support during movement thereof to actuate said power actuating control means for effecting reversed engagement of said clutch means and reversed movement of said power actuated device, whereby said support and said device connected lever are respectively moved in a corresponding reversed direction.

5. In a machine tool;
a reciprocable support;
power driven reverse clutch means including a cooperating clutch element selectively engageable in either direction from neutral to transmit power to said support for movement thereof in a selected direction;

a lever movable in opposite directions from a neutral position into a position corresponding to the direction in which said support is to be moved;

direction determining switch means selectively actuatable by movement of said lever in either direction from its neutral position;

power actuating control means operated by said direction determining switch means to effect selective engagement of said clutch element for moving said support in selected direction;

a power actuated device moved by said lever whenever said lever is manually moved to actuate said switch means to start movement of said support, said power actuated device being operatively connected to said power actuating control means for selective movement thereby, said power actuated device, when so moved moving said lever to actuate said switch means during movement of said support;

and reverse control means actuated by said support during movement thereof operatively connected to said power actuating control means for effecting reversed engagement of said clutch means by reversed movement of said device, whereby said support and said lever are respectively moved in a corresponding reversed direction.

6. In a machine tool control system;
a frame;
a member carried for movement by said frame;
a control post secured to said frame in proximity to said member;
a plurality of control switches carried by said control post in a manner that the actuating portions thereof are in confronting relationship to said member;
a power driven variable speed transmission mechanism including a pair of reversible clutch elements driven thereby;

a clutch spool axially movable in either direction from a neutral position to engage one of said clutch elements for transmitting power to said member for moving said member in a selected direction;

an axially movable power piston and a cooperating cylinder, said power piston being operatively connected to said clutch spool to move said clutch spool from neutral position to one of its two reversibly engaged positions and for retaining said spool in one of its three selected positions;

a hydraulic circuit including associated valves selectively directing hydraulic fluid to said cylinder for moving said power piston to one of its three positions and for retaining it in such position;

a selectively actuatable control circuit including a source of power operatively connected to said variable speed transmission and to said valves, said circuit being actuated by coded actuation of one or more of said switches for operating said valves and said variable speed transmission during movement of said member to drive said member at a selected rate and direction of movement;

a plurality of switch actuating dogs adjustably secured to said member in predetermined relationship and being respectively operative upon movement relative to said control post to actuate selected ones of said switches in code fashion;

a manually movable directional lever and associated control switch means actuatable upon movement of said lever in either direction from a neutral position, said switch means being so associated with said control circuit for starting movement of said member relative to said control post and in a direction corresponding to the directional movement of said lever; and, a second piston, including a cooperating cylinder interconnected with said hydraulic circuit in parallel with said cylinder associated with said power piston, said second piston being connected to said directional lever to move said directional lever when said parallel circuit is actuated incident to operation of said hydraulic circuit to move said power piston, the automatic movement of said lever by said second piston actuating said clutch means.

7. In a machine tool;
a reciprocable support;
power driven clutch means reversibly engageable to transmit power to said support to move said support in a selected direction;

a lever movable in opposite directions from a neutral position into a position corresponding to the direction in which said support is to be moved;

reversibly operative switch means selectively actuated by movement of said lever in either direction from neutral;

hydraulic control means for actuating said reverse clutch means and selectively rendered operative by said switch means to effect preselected engagement of said reverse clutch means for moving said support in selected direction;

a power actuated device moved in either direction from neutral by said lever when it is moved from its neutral position to actuate said switch means said device also being operatively connected with respect to said hydraulic control means so that it may be selectively moved by said hydraulic control means to move said lever for actuating said switch means during movement of said support;

and reverse control means predeterminately operative during support movement to actuate said hydraulic control means for effecting reversed movement of said device and said switch means for moving said support and said lever in corresponding reversed directions.

8. In a machine tool;

a reciprocable support;
power drive means for moving said support;
reverse clutch means selectively engageable in either direction from neutral for transmitting power from said drive means to said support for movement thereof in selected direction;
a first cylinder and cooperating first piston carried thereby connected to said clutch means to effect selective engagement of said clutch means;
a lever swingable in opposite directions from neutral position into a direction corresponding to the direction in which said support is to be moved;
direction control switch means;
a hydraulic system having control valves actuated by said switch means and fluid supply lines extending to said first cylinder and connected upon actuation of said switch means to move said piston to effect selective engagement of said clutch means for moving said support in preselected direction;
said valves and said fluid supply lines being normally connected to said first cylinder to maintain said first piston in a neutral centered position for maintaining said clutch means in a corresponding neutral position;
a second cylinder and cooperating second piston interconnected by said fluid supply lines in parallel with said first piston, said second piston connected to said lever to be moved by said lever in opposition to fluid pressure from said supply lines, said switch means being in a position to be actuated by the movement of said second piston and lever to actuate said valves for connecting said fluid lines to urge said pistons in one required direction for starting movement of said support;
and, reverse control means actuated by said support during movement thereof for effecting actuation of said valves to condition said fluid lines to effect reversed movement of said pistons,
whereby said support and said lever are respectively moved in a corresponding reversed direction.

9. In a machine tool control system;
a reciprocable member;
power driven reverse clutch means selectively engageable from a neutral non-driving position for transmitting power to and driving said member in a selected one of two directions;
a power actuator movable in either direction from a neutral position;
hydraulic actuating means including control valves connected to said reverse clutch means and said power actuator, said valves being normally connectable to maintain said clutch means in a neutral non-driving position and to maintain said power actuator in neutral position, said control valves being selectively actuatable to connect said hydraulic actuating means for moving said power actuator in selected direction from neutral and for coordinately effecting engagement of said reverse clutch means for moving said member in selected direction;
a manual directional lever connected to said power actuator to be moved by said power actuator, said lever being movable in either direction from neutral for moving said power actuator from neutral in opposition to said hydraulic actuating means;
and circuit control means including switching means to be selectively coordinated with respect to said lever actuated upon movement of said lever from neutral position, said circuit control means, when actuated, actuating said control valves to so connect said hydraulic actuating means as to maintain said power actuator in selected position and simultaneously to effect engagement of said reverse clutch means for moving said member in a direction corresponding to the directional position of said lever.

10. In reverse control system for a reciprocable machine tool member;
power driven reverse clutch means selectively engageable from a neutral position for transmitting power to said member for driving said member in a selected one of two directions;
a first hydraulic cylinder including a cooperating piston connected to said reverse clutch means and movable to effect selective engagement of said reverse clutch means;
a second hydraulic cylinder and a cooperating piston movable in either direction from a neutral position and being interconnected in parallel with said first cylinder;
fluid drive means including control valves normally connected to said cylinders to maintain said pistons in a neutral non-driving position;
a manual directional control lever pivotably mounted and connected to said second piston to be moved thereby, said control lever being manually movable in either direction from neutral for moving said second piston in opposition to said fluid drive means;
a control circuit including switch means actuated by movement of said lever from neutral, said control circuit including means to actuate said valves when said switch means are actuated for connecting said fluid drive means to urge said pistons in the same direction for effecting engagement of said clutch means for moving said member in a direction corresponding to the directional position of said lever;
and reverse control means predeterminately actuated by said member during movement thereof for operating said valves to connect said fluid drive means to said cylinders for moving said pistons to their opposite positions from neutral to reverse the directional position of said lever and simultaneously to effect reversed engagement of said clutch means for effecting correspondingly reversed movement of said member.

11. In a control system for a reciprocable machine tool member;
power driven reverse clutch means including a clutch element engageable in either direction from a neutral position for transmitting power to and driving said member in a selected one of two directions;
a first power clutch actuator movable in either direction from neutral for effecting corresponding engagement of said clutch element to drive said member in selected direction;
a second power actuator;
fluid drive means interconnecting said actuators in parallel and including control valves normally conditioned to urge both of said actuators to neutral position;
a control circuit including switch means so positioned as to be selectively actuatable by movement of said second power actuator in a selected direction from neutral and being connected to said valves to actuate said valves for re-conditioning said fluid drive means to urge said first power actuator from its neutral position for effecting selective engagement of said clutch element; and
a directional control lever pivotably connected to said second power actuator and being manually movable in either direction from neutral for moving said second power actuator independently of said first power actuator to selectively actuate said switch means for initiating movement of said member in a direction corresponding to the direction of lever movement, said lever being manually returnable to a neutral position for moving said second actuator to deactuate said switching means for stopping movement of said member.

12. In a machine tool;
a rectilinearly movable member;
a power driven transmission mechanism;
a pair of rotatable clutch elements driven in reversed direction by said transmission mechanism;
a clutch spool operatively connected to said member and movable in either direction from a neutral position to engage one of said clutch elements for driving said member in either selected direction;
a first hydraulic cylinder and a cooperating first piston said thereby for axial movement, said piston being connected to said clutch spool for creating corresponding movements of said clutch spool;
a hydraulic system including control valves and fluid pressure supply lines respectively connected to said first cylinder for supplying pressure fluid thereto for normally maintaining said first piston in neutral position to maintain said clutch spool in corresponding neutral disengaged position;
a second hydraulic cylinder including a second piston carried thereby for movement in either direction from neutral and being interconnected with said fluid supply lines in parallel with said first cylinder;
a pivotable directional lever connected to said second piston to be moved thereby said lever optionally being movable in either direction from neutral into a direction corresponding to the direction in which said member is to be moved and for effecting movement of said second piston from its neutral position.

13. In a machine tool control system;
a reciprocable member;
hydraulically actuatable power driven reverse clutch means including a clutch spool selectively engageable upon movement in either direction from a neutral position for transmitting power to said member and driving said member in a selected one of two directions;
a cylinder and a cooperating piston movable in either direction from a neutral position;
hydraulic means including fluid supply lines connected to said clutch spool and cylinder and control valves normally conditioned to maintain said clutch spool in a neutral non-driving position and to maintain said piston in a neutral centered position;
a manual directional lever connected to said piston, for movement thereby said lever being itself movable in either direction from neutral into a position corresponding to the directional movement of said member and through said connection moving said piston from neutral in opposition to said hydraulic means;
circuit control means including switch means so located as to be actuated by movement of said lever from a neutral into a selected directional position, said switch means connected to and operating said valves for connecting said fluid supply lines to said piston and said clutch spool to maintain said piston in selected directional position and simultaneously to effect engagement of said clutch spool for moving said member in a direction corresponding to the directional position of said lever;
code actuated switches interconnected in said circuit control means for predeterminate selective actuation and, when actuated, to connect said fluid supply lines to said cylinder and said clutch spool for moving said piston to its opposite position from neutral to reverse the directional position of said lever and simultaneously therewith to effect reversed engagement of said clutch spool,
and switch actuating means adjustably secured relative to said member for effecting selective actuation of said code actuated switches during movement of said member.

No references cited.

DON A. WAITE, *Primary Examiner.*

UNITED STATES PATENT OFFICE
CERTIFICATE OF CORRECTION

Patent No. 3,220,274                          November 30, 1965

John G. Osburn et al.

It is hereby certified that error appears in the above numbered patent requiring correction and that the said Letters Patent should read as corrected below.

Column 2, line 53, for "disengages" read -- disengage --; column 6, line 73, for "with" read -- within --; column 7, line 17, for "expecting" read -- excepting --; line 46, for "76A" read -- 74A --; column 9, line 40, for "knee 36" read -- knee 26 --; column 10, line 33, for "late" read -- plate --; column 11, line 29, for "rightway" read -- rightward --; column 18, line 3, for "the" read -- then --; line 54, for "direction" read -- directional --; column 37, line 10, for "said thereby for axial movement," read -- carried thereby for axial movement in either direction from a neutral position, --; line 29, after "position" strike out the period and insert the following:

> ; and reverse switch control means so situated as to be engaged and actuated by the movement of said lever and piston from neutral position, including means actuated by said switch control means for operating said valves and creating corresponding movement of said member.

Signed and sealed this 28th day of November 1967.

(SEAL)
Attest:

EDWARD M. FLETCHER, JR.                     EDWARD J. BRENNER
Attesting Officer                            Commissioner of Patents